(12) United States Patent
Darby

(10) Patent No.: US 10,271,580 B2
(45) Date of Patent: Apr. 30, 2019

(54) APPAREL ITEM CONFIGURED FOR REDUCED CLING PERCEPTION

(71) Applicant: NIKE, Inc., Beaverton, OR (US)

(72) Inventor: Christian Darby, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 97 days.

(21) Appl. No.: 15/263,537

(22) Filed: Sep. 13, 2016

(65) Prior Publication Data

US 2017/0071275 A1    Mar. 16, 2017

Related U.S. Application Data

(60) Provisional application No. 62/218,187, filed on Sep. 14, 2015.

(51) Int. Cl.
*A41B 1/08* (2006.01)
*A41B 17/00* (2006.01)
(Continued)

(52) U.S. Cl.
CPC .............. *A41B 1/08* (2013.01); *A41B 17/005* (2013.01); *A41B 9/06* (2013.01); *A41B 2400/20* (2013.01);
(Continued)

(58) Field of Classification Search
None
See application file for complete search history.

(56) References Cited

U.S. PATENT DOCUMENTS 2,738,566 A * 3/1956 Scott, Jr. ................. D04B 1/102
28/163
4,057,981 A * 11/1977 Runac ...................... D04B 1/26
66/185
(Continued)

FOREIGN PATENT DOCUMENTS

CN       200994420 Y  * 12/2007   ............... A41D 3/02
CN       202023101 U  * 11/2011
(Continued)

OTHER PUBLICATIONS

International Preliminary Report on Patentability dated Mar. 29, 2018 in International Patent Application No. PCT/US2016/051573, 13 pages.
(Continued)

*Primary Examiner* — Jeffrey A Vonch
(74) *Attorney, Agent, or Firm* — Shook, Hardy and Bacon LLP

(57) ABSTRACT

An apparel item configured to reduce the perception of cling is provided herein. The apparel item comprises a first set of outwardly-projecting nodes on a first portion of the apparel item, a second set of outwardly-projecting nodes on a second portion of the apparel item, and a third set of inwardly-projecting nodes on a third portion of the apparel item, where the third set of nodes is positioned between the first set of nodes and the second set of nodes. The first and second sets of outwardly-projecting nodes comprise apertures that provide a communication passage from an outer surface of the apparel item to an inner surface of the apparel item. Besides reducing the surface area of the apparel item that comes into contact with a wearer's skin surface, the nodes also facilitate cooling the wearer and speed up drying times of the apparel item when being worn.

20 Claims, 13 Drawing Sheets

(51) Int. Cl.
  *A41D 27/28* (2006.01)
  *D03D 3/08* (2006.01)
  *D04B 1/10* (2006.01)
  *D04B 1/24* (2006.01)
  *B32B 3/24* (2006.01)
  *B32B 3/28* (2006.01)
  *B32B 3/30* (2006.01)
  *A41D 1/04* (2006.01)
  *B32B 1/00* (2006.01)
  *B32B 3/26* (2006.01)
  *A41B 9/06* (2006.01)
  *A41D 13/00* (2006.01)
  *D03D 27/12* (2006.01)
  *D04B 1/02* (2006.01)
  *D03D 13/00* (2006.01)

(52) U.S. Cl.
  CPC ............ *A41D 1/04* (2013.01); *A41D 13/0015* (2013.01); *A41D 27/28* (2013.01); *A41D 2400/20* (2013.01); *A41D 2400/22* (2013.01); *A41D 2400/24* (2013.01); *A41D 2400/60* (2013.01); *A41D 2500/10* (2013.01); *A41D 2500/20* (2013.01); *A41D 2600/10* (2013.01); *B32B 1/00* (2013.01); *B32B 3/266* (2013.01); *B32B 3/28* (2013.01); *B32B 3/30* (2013.01); *B32B 2307/724* (2013.01); *B32B 2307/746* (2013.01); *B32B 2437/00* (2013.01); *D03D 3/08* (2013.01); *D03D 13/004* (2013.01); *D03D 27/12* (2013.01); *D04B 1/02* (2013.01); *D04B 1/10* (2013.01); *D04B 1/246* (2013.01); *Y10S 2/01* (2013.01); *Y10T 428/24182* (2015.01); *Y10T 428/24273* (2015.01); *Y10T 428/24281* (2015.01); *Y10T 428/24628* (2015.01); *Y10T 428/24636* (2015.01); *Y10T 442/30* (2015.04); *Y10T 442/3179* (2015.04); *Y10T 442/40* (2015.04); *Y10T 442/45* (2015.04)

(56) References Cited

U.S. PATENT DOCUMENTS

| | | | | |
|---|---|---|---|---|
| 4,451,934 | A * | 6/1984 | Gioello | A41B 9/00 2/113 |
| 5,547,733 | A | 8/1996 | Rock et al. | |
| 5,724,673 | A | 3/1998 | Aldridge et al. | |
| 5,809,567 | A * | 9/1998 | Jacobs | A41D 7/00 2/1 |
| 5,829,057 | A * | 11/1998 | Gunn | A41B 11/00 2/69 |
| 5,913,406 | A * | 6/1999 | Lofgren | A41D 31/0011 2/51 |
| 6,276,178 | B1 * | 8/2001 | West | D04B 21/02 66/193 |
| 6,927,182 | B2 | 8/2005 | Rock et al. | |
| 7,043,766 | B1 * | 5/2006 | Foreman | A41B 9/06 2/69 |
| 7,428,772 | B2 | 9/2008 | Rock | |
| 7,737,056 | B2 | 6/2010 | Chang | |
| 8,133,824 | B2 | 3/2012 | Harber | |
| 8,187,984 | B2 | 5/2012 | Rock | |
| 8,479,322 | B2 | 7/2013 | Blackford et al. | |
| 8,555,414 | B2 | 10/2013 | Davis et al. | |
| 8,650,668 | B2 | 2/2014 | Curtis | |
| 8,910,313 | B2 | 12/2014 | Gordon et al. | |
| 9,635,889 | B1 * | 5/2017 | Copeland | A41D 13/0056 |
| 2001/0042388 | A1 * | 11/2001 | West | D04B 21/10 66/195 |
| 2003/0077967 | A1 * | 4/2003 | Rock | D04B 1/04 442/312 |
| 2003/0101776 | A1 * | 6/2003 | Shirasaki | A47C 31/006 66/196 |
| 2005/0126229 | A1 * | 6/2005 | Deguchi | A41B 17/00 66/202 |
| 2005/0204449 | A1 * | 9/2005 | Baron | A41D 1/04 2/69 |
| 2006/0037154 | A1 | 2/2006 | Goineau et al. | |
| 2006/0070162 | A1 * | 4/2006 | Frank | A41D 13/0025 2/69 |
| 2006/0080754 | A1 * | 4/2006 | Baron | A41D 13/002 2/85 |
| 2006/0179539 | A1 * | 8/2006 | Harber | A41D 13/002 2/69 |
| 2006/0277950 | A1 * | 12/2006 | Rock | A41D 13/002 66/169 R |
| 2007/0033696 | A1 * | 2/2007 | Sellier | A41D 13/0017 2/69 |
| 2007/0094762 | A1 * | 5/2007 | Carter | A41D 15/005 2/69 |
| 2007/0144221 | A1 * | 6/2007 | Sytz | D04B 1/18 66/171 |
| 2007/0220673 | A1 * | 9/2007 | Nichols | A41D 31/02 5/420 |
| 2007/0293106 | A1 * | 12/2007 | Harber | A41D 1/04 442/2 |
| 2008/0075850 | A1 * | 3/2008 | Rock | A41D 31/0038 427/176 |
| 2008/0189824 | A1 * | 8/2008 | Rock | D04B 1/02 2/69 |
| 2008/0189839 | A1 | 8/2008 | Lambertz | |
| 2008/0289078 | A1 * | 11/2008 | Mather | A41D 1/04 2/85 |
| 2009/0031486 | A1 * | 2/2009 | Sokolowski | A41D 1/04 2/458 |
| 2009/0104404 | A1 * | 4/2009 | Polegato Moretti | A41D 31/02 428/137 |
| 2009/0276936 | A1 * | 11/2009 | Makida | D06M 15/53 2/69 |
| 2010/0064415 | A1 * | 3/2010 | Melhart | A41D 13/0015 2/125 |
| 2011/0099680 | A1 * | 5/2011 | Gordon | A41D 27/28 2/79 |
| 2011/0177294 | A1 * | 7/2011 | Rock | B32B 5/26 428/166 |
| 2011/0239350 | A1 * | 10/2011 | Ho | A41D 27/28 2/93 |
| 2013/0074250 | A1 * | 3/2013 | Curtis | A41D 27/02 2/458 |
| 2013/0078415 | A1 * | 3/2013 | Rock | D04B 1/00 428/96 |
| 2013/0133123 | A1 * | 5/2013 | Wright | A41D 13/05 2/69 |
| 2013/0178146 | A1 | 7/2013 | Stockett | |
| 2013/0212767 | A1 * | 8/2013 | Nordstom | A41D 13/0015 2/69 |
| 2013/0247268 | A1 * | 9/2013 | Niwa | A41D 7/00 2/67 |
| 2014/0259276 | A1 | 9/2014 | Fier | |
| 2014/0310846 | A1 * | 10/2014 | Carter | A41D 1/04 2/69 |
| 2014/0310847 | A1 * | 10/2014 | Ulriksen | A41D 27/28 2/69 |
| 2015/0366281 | A1 * | 12/2015 | Miller | B32B 27/12 428/136 |
| 2016/0050981 | A1 * | 2/2016 | Costa | A41B 17/00 2/69 |
| 2016/0192723 | A1 * | 7/2016 | Zhu | A41D 31/02 2/69 |
| 2016/0302494 | A1 * | 10/2016 | Smart | A41D 13/0015 |
| 2016/0302495 | A1 * | 10/2016 | Smart | A63B 71/1225 |
| 2017/0340037 | A1 * | 11/2017 | Bailey | A41D 27/285 |

(56) References Cited

U.S. PATENT DOCUMENTS

| | | | | |
|---|---|---|---|---|
| 2017/0354266 A1* | 12/2017 | Nordentoft | .......... | A47C 21/044 |
| 2018/0035727 A1* | 2/2018 | Cumiskey | .......... | A41D 13/0015 |

FOREIGN PATENT DOCUMENTS

| | | | | | |
|---|---|---|---|---|---|
| CN | 102650105 | A | * | 8/2012 | |
| CN | 103815556 | A | * | 5/2014 | |
| CN | 103815558 | A | * | 5/2014 | |
| CN | 104621719 | A | * | 5/2015 | |
| DE | 202007004756 | U1 | * | 5/2007 | |
| EP | 1241286 | A1 | * | 9/2002 | ............. D04B 1/243 |
| EP | 1806061 | A1 | | 7/2007 | |
| GB | 1447173 | A | | 8/1976 | |
| GB | 2193429 | A | * | 2/1988 | ............... A41B 9/00 |
| GB | 2344738 | A | * | 6/2000 | ............... A41D 3/00 |
| JP | 10053941 | A | * | 2/1998 | |
| JP | 11302939 | A | * | 11/1999 | |
| JP | 2000158577 | A | * | 6/2000 | |
| JP | 2001081607 | A | * | 3/2001 | |
| JP | 2003147605 | A | * | 5/2003 | |
| JP | 2003239102 | A | * | 8/2003 | |
| JP | 2004204411 | A | * | 7/2004 | |
| JP | 2006028648 | A | * | 2/2006 | ............... A41D 7/00 |
| JP | 2006037310 | A | * | 2/2006 | |
| JP | 2008038259 | A | * | 2/2008 | ............. A41B 9/001 |
| JP | 2008214775 | A | * | 9/2008 | |
| JP | 2013067910 | A | | 4/2013 | |
| KR | 19990037414 | U | * | 5/1999 | ............... A41D 3/00 |
| KR | 20000012332 | A | * | 3/2000 | |
| KR | 100828077 | B1 | * | 5/2008 | |
| WO | WO-02089616 | A1 | * | 11/2002 | ............. A41B 9/001 |
| WO | WO-2004064554 | A1 | * | 8/2004 | ............... A41B 9/06 |
| WO | WO-2008069522 | A1 | * | 6/2008 | ............... D04B 1/24 |

OTHER PUBLICATIONS

"Natural Workout Wear-prevents skin irritation and unwanted odors"; soulintraining.wordpress.com Last accessed Jul. 3, 2015 at: https://soulintraining.wordpress.com/category/philippine-star-column/page/5/.

"Performance. Strength. Confidence." www.marenagroup.com Last accessed Jul. 3, 2015 at: https://www.marenagroup.com/athletics8/pages/why-marena/how-it-works.html.

"A New Method for Designing Sportswear by Using Three Dimensional Computer Graphic Based Anisotropic Hyperlastic Models and Musculoskeletal Simulations", www.sciencedirect.com Last accessed Jul. 3, 2015 at: http://www.sciencedirect.com/science/article/pii/S187770581301120X.

International Search Report and Written Opinion dated Feb. 22, 2017 in International Patent Application No. PCT/US2016/051573, 18 pages.

* cited by examiner

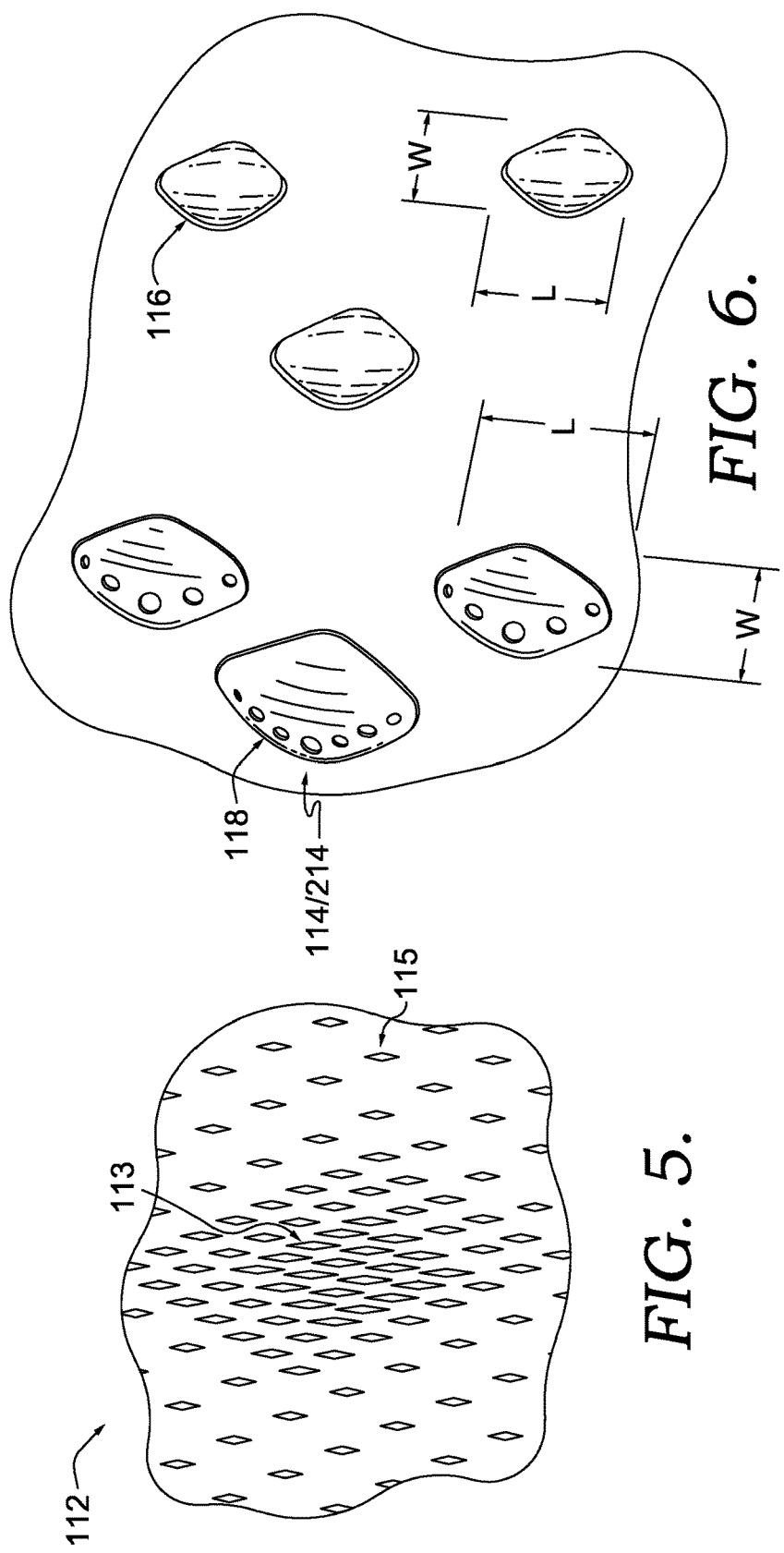

APPAREL ITEM CONFIGURED FOR REDUCED CLING PERCEPTION

CROSS-REFERENCE TO RELATED APPLICATIONS

This application, having U.S. application Ser. No. 15/263,537, filed Sep. 13, 2016, and entitled "Apparel Item Configured for Reduced Cling Perception," claims priority to U.S. Prov. App. No. 62/218,187, entitled "Apparel Item Configured for Reduced Cling Perception," and filed Sep. 14, 2015. The entirety of the aforementioned application is incorporated by reference herein.

BACKGROUND

Athletes engaged in sports that involve a lot of aerobic activity, e.g., soccer, basketball, tennis, running, etc., often produce large amounts of sweat. Apparel items, such as tops, worn during these activities may quickly become saturated with perspiration, may "cling" or adhere to the skin of the wearer, and/or may become uncomfortable to the wearer, e.g., due to an increased perception of cling and/or an increased weight of the apparel item from sweat absorption. For example, an increased perception of cling by the wearer may mentally distract the wearer during athletic activities. As well, an increased weight of the apparel item due to sweat absorption may physically impede the wearer's performance.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

At a high level, aspects herein are directed to an apparel item, such as a top, that is configured to reduce the perception of cling. This is achieved, in one aspect, through a combination of inwardly- and outwardly-projecting nodes that extend from the fabric surface of the apparel item. The nodes, in one aspect, help to decrease the surface area of the apparel item that comes into contact with the wearer's skin. By reducing the amount of surface area of the apparel item that comes into contact with the wearer's skin, there is less surface area available to become saturated with sweat and to cling to the wearer.

The inwardly-projecting nodes may create channels and/or passages between the inner-facing surface of the apparel item and the wearer's skin. Moreover, the outwardly-projecting nodes may have apertures that help to channel air into and out of the apparel item. This combination may create air flow paths in the space between the apparel item and the wearer's skin helping to cool the wearer, facilitate drying of the apparel item, and thus help to reduce the perception of cling.

The apparel item may also comprise a plurality of perforations located at areas of the apparel item that are positioned adjacent to high heat-producing areas of the wearer such as the mid-front torso area and the mid-back torso area. The perforations facilitate the flow of ambient air into the apparel item. This also helps to cool the wearer and may cause the apparel item to dry faster, both of which may lessen the perception of cling.

To further help reduce the perception of cling, the apparel item may comprise integrally-formed offset structures located on an inner-facing surface of the apparel item. The offset structures may be located along the sides and the bottom margins of the apparel item and help to "lift" the apparel item off the wearer's skin in these areas. These locations generally correspond to areas often noted as being associated with increased cling. The number, size and density of the offset structures are such as to reduce the surface area of the apparel item that comes into contact with the wearer's skin and thereby reduce the potential for sweat saturation of the apparel item.

The combination of quicker drying times along with the reduced perception of cling produced by the structures and configurations discussed above makes the apparel item suitable for sports requiring high amount of aerobic activity, especially bursts of aerobic activity, such as soccer, basketball, tennis, and the like. As described above, the aerobic activity associated with these types of sports often results in the athlete producing large quantities of perspiration or sweat.

BRIEF DESCRIPTION OF THE DRAWINGS

The present invention is described in detail below with reference to the attached drawing figures, wherein:

FIG. 5 illustrates a close-up view of the area indicated on FIG. 1 and illustrates a plurality of perforations and a gradient in the density of the perforations in accordance with aspects hereof;

FIG. 6 illustrates a close-up view of the area indicated on FIG. 1 and illustrates outwardly-projecting and inwardly-projecting nodes in accordance with aspects hereof;

DETAILED DESCRIPTION

Figure 1:
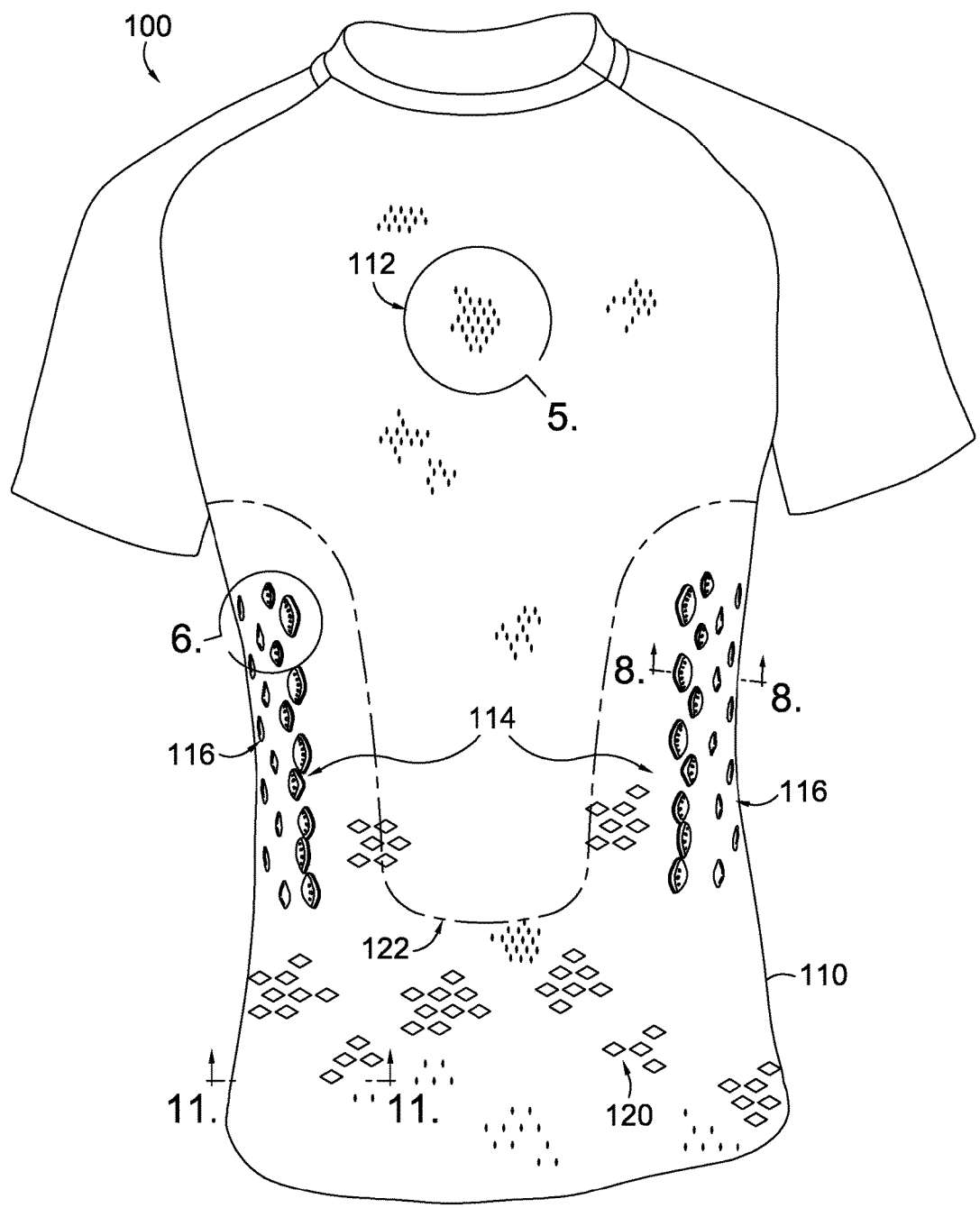
FIG. 1 illustrates a front view of an exemplary apparel item configured to reduce the perception of cling in an un-worn configuration in accordance with aspects hereof.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Aspects herein provide for an apparel item, such as a top, configured to reduce the perception of cling. Cling may be experienced by a wearer of an article of apparel when the article becomes sodden with sweat or other moisture (e.g., rain). This "clinging" of the article to a wearer (e.g., the wearer's skin) is often perceived to be more pronounced and therefore perceptionally worse along the side and bottom portions of the article. For example, in the case of an upper torso garment, such as a shirt, jersey, or top, the wearer may complain of the garment clinging to the flank areas of the wearer (e.g., left and right lumbar region on the posterior and/or anterior portions of the wearer), which can be distracting to the wearer. Although much of the description provided herein is directed toward an apparel item for an upper torso of a wearer, it is contemplated that the configurations and structures described herein may be applied to other articles of apparel to achieve similar effects. Examples of alternative articles of apparel will be provided below when applicable.

In one exemplary aspect, the apparel item described herein comprises a first set of self-standing, integrally-formed nodes projecting or extending outward from the base fabric material used to form the apparel item. In other words, the nodes are configured to project toward an external environment and away from a wearer's skin surface when the apparel item is in an as-worn configuration. The outwardly-projecting nodes may be located along right and left front side portions and right and left back side portions of the apparel item in exemplary aspects. The outwardly-projecting nodes located at the front side portions of the apparel item may comprise a set of apertures that are positioned on a leading edge of the nodes such that they are oriented or facing toward a front midline of the apparel item. The outwardly-projecting nodes located at the back side portions of the apparel item may also comprise a set of apertures. These apertures, however, may be positioned on a trailing edge of the nodes such that they are oriented or facing toward a back midline of the apparel item.

Continuing, the apparel item described herein further comprises a second set of self-standing, integrally-formed nodes that project inward from the base fabric material used to form the apparel item. In other words, the nodes are adapted to project toward a wearer's skin surface and away from the external environment when the apparel item is in the as-worn configuration. The inwardly-projecting nodes may be located between the outwardly-projecting nodes on the front side portions of the apparel item and the outwardly-projecting nodes located on the back side portions of the apparel item. As such, the inwardly-projecting nodes may be located generally along side portions of the apparel item. When the apparel item is worn, the inwardly-projecting nodes may be adapted to be positioned adjacent to a mid-axillary line of the wearer. In exemplary aspects, the inwardly-projecting nodes may not have any apertures.

By configuring the outwardly-projecting nodes and the inwardly-projecting nodes generally on the right and left side portions of the apparel item, the surface area of the fabric material contacting the wearer's skin in these areas is effectively reduced. By reducing the amount of surface area of the fabric material that comes into contact with the wearer's skin, the configuration described reduces the surface area of the fabric material exposed to sweat which ultimately may help to reduce the perception of cling in these areas.

Additionally, the configuration described may also act as valves that allow heated air located in the space between the apparel item and the wearer's skin to escape. More specifically, air located in the space between the inner-facing surface of the apparel item and the wearer's skin surface may be heated by the wearer's intrinsic heat production. Once heated, the air may increase in volume and become more buoyant. The apertures located on the outwardly-projecting nodes may thus act as escape valves allowing the buoyant and heated air to escape into the external environment thereby helping to cool the wearer and potentially helping to reduce the perception of cling.

Additionally, the apertures located on the outwardly-projecting nodes may help to channel air from the external environment to the area or space between the inner-facing surface of the apparel item and the wearer's skin surface. For instance, by configuring the apertures on the outwardly-projecting nodes located along the front side portions of the apparel item to face toward the front midline, the apertures are positioned to channel wind or air flowing toward and over the front of the wearer. This type of air flow pattern often occurs when the wearer is moving (e.g., running) in a forward direction. Once channeled into the space between the inner-facing surface of the apparel item and the wearer's skin surface, the inwardly-projecting nodes—which may be positioned in a honeycomb-like or staggered pattern—create channels or passages through which the air can continue to flow. This air flow pattern may help to speed up the rate at which the apparel item dries, which, in turn, may further reduce the wearer's perception of cling. Further, the channeled air may help to cool the wearer via, for instance, evaporative cooling. Moreover, in exemplary aspects, as air passes through the channels or passages, the heating of the air by the wearer's intrinsic body heat may create convection currents that ultimately carry the air to the outwardly-projecting nodes located on, for instance, the back side portions and/or the front side portions of the apparel item by which the air can leave the interior space via the apertures located on these nodes.

The apparel item described herein may be further configured to help reduce cling perception by comprising a plurality of perforations that extend through the thickness of the fabric material forming the apparel item. The perforations may be generally located over the front and back sides of the apparel item. The density of the perforations, moreover, may be greater over the front midline and the back midline of the apparel item as these portions are positioned adjacent to high-heat producing areas of the body (e.g., the center front torso and the center back torso of the wearer). The perforations further help to facilitate air flow into the space between the apparel item and the wearer's body facilitating faster drying of the apparel item and helping to cool the wearer.

In a further configuration to reduce cling perception, the apparel item may comprise a plurality of integrated offsets structures located on an inner-facing surface of the apparel item. The offset structures may, in exemplary aspects, be located along the sides of the apparel item and along the bottom margins of the back and front of the apparel item. The offset structures may be formed through, for instance, a knitting process. For example, the material used to form the apparel item may be a knit material knitted using a Jacquard knitting machine. The Jacquard knitting machine may be programmed to alter the stitch pattern in preconfigured areas to form the integrated offset structures. The offset structures may project inwardly a short distance from the base contact level of the material thus helping to "lift" the material away from the wearer's skin when the apparel item is worn. The size, number, and density of the offset structures may be such so as to reduce the surface area of the apparel item that comes into contact with the wearer's skin in the areas where the offset structures are located thereby helping to reduce the perception of cling.

Accordingly, aspects herein provide for an apparel item for an upper torso of a wearer configured for reduced cling perception. The apparel item comprises a front portion and a back portion that together help to form the apparel item. The front portion and the back portion are formed from a fabric material having a base contact level. The apparel item further comprises a first set of self-standing nodes located in a first area of the apparel item, where the first set of self-standing nodes project outward from the fabric material a first distance from the base contact level. At least a portion of the first set of self-standing nodes has a plurality of apertures. The apparel item further comprises a second set of self-standing nodes located in a second area of the apparel item, where the second set of self-standing nodes project outward from the fabric material a second distance from the base contact level. At least a portion of the second set of self-standing nodes has a plurality of apertures. The apparel item additionally comprises a third set of self-standing nodes located in a third area of the apparel item, where the third set of self-standing nodes project inward from the fabric material a third distance from the base contact level.

In another aspect, an apparel item for an upper torso of a wearer configured to reduce the perception of cling is provided. The apparel item comprises a front and back portion formed from a knit material having a base contact level. The apparel item further comprises a plurality of inwardly-projecting nodes; a plurality of perforations; and a plurality of integrated offset structures located on an inner-facing surface of the apparel item.

In yet another aspect, a method of manufacturing an apparel item configured to reduce the perception of cling is provided. The method comprises providing a fabric material having a first surface and an opposite second surface; forming a first plurality of nodes on the first surface of the fabric material at one or more discrete areas of the fabric material, the first plurality of nodes projecting from the first surface of the fabric material; forming a plurality of apertures in at least a subset of the first plurality of nodes; and forming the fabric material into the apparel item.

Figure 2:
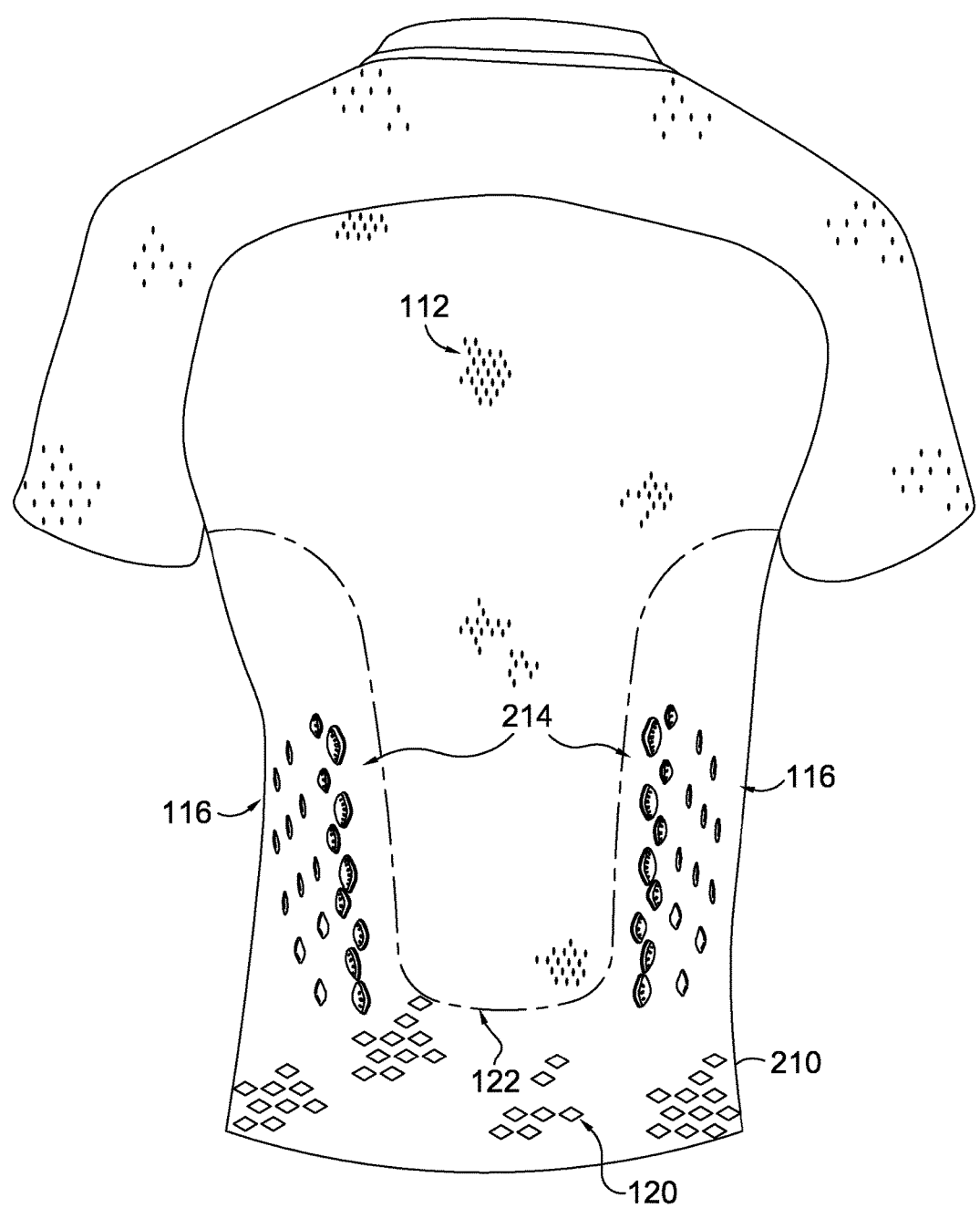
FIG. 2 illustrates a back view of the exemplary apparel item of FIG. 1 in accordance with aspects hereof.
Figure 3:
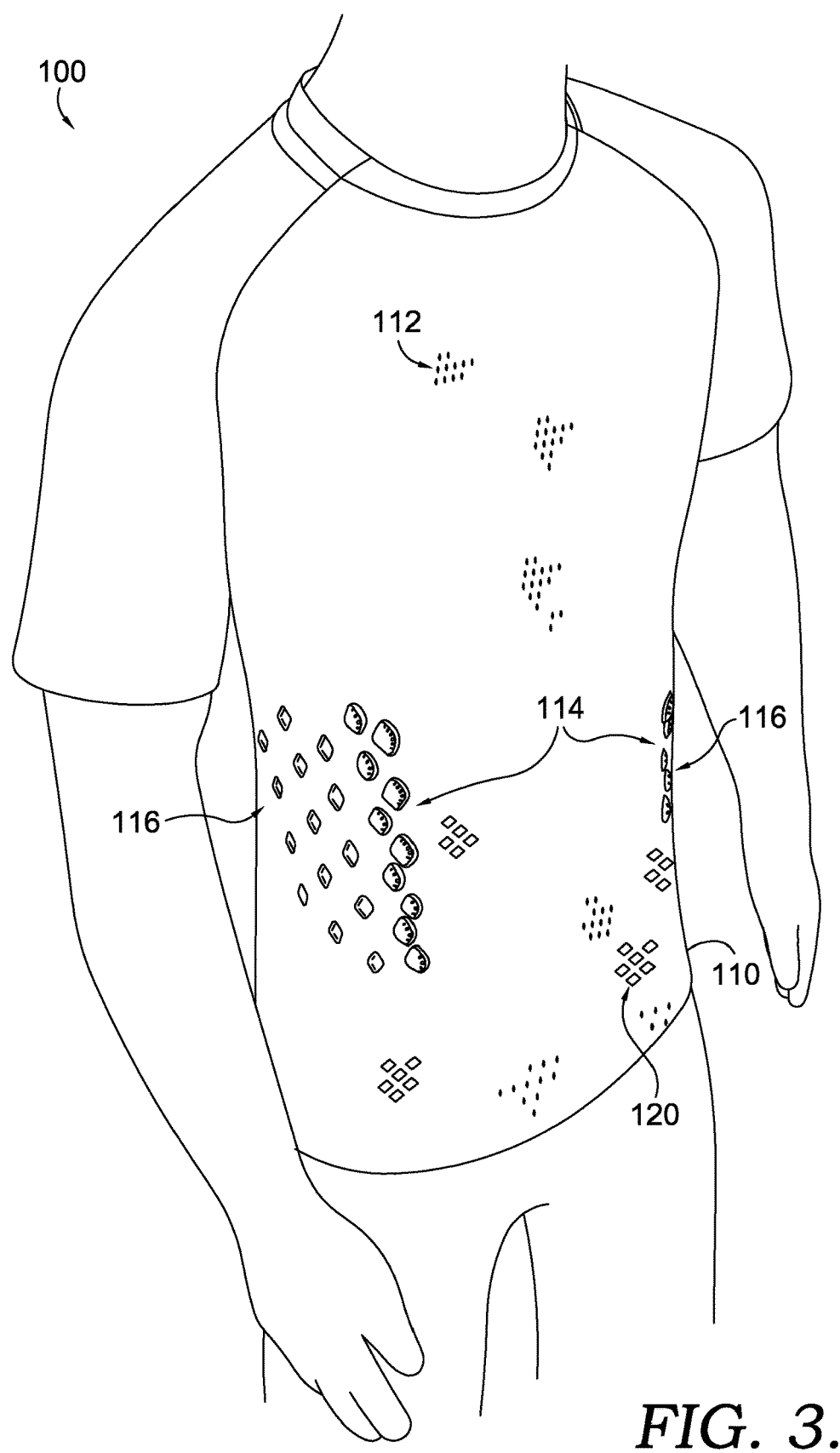
FIG. 3 illustrates a front perspective view of the exemplary apparel item configured to reduce the perception of cling of FIG. 1 in an as-worn configuration in accordance with aspects hereof.
Figure 4:
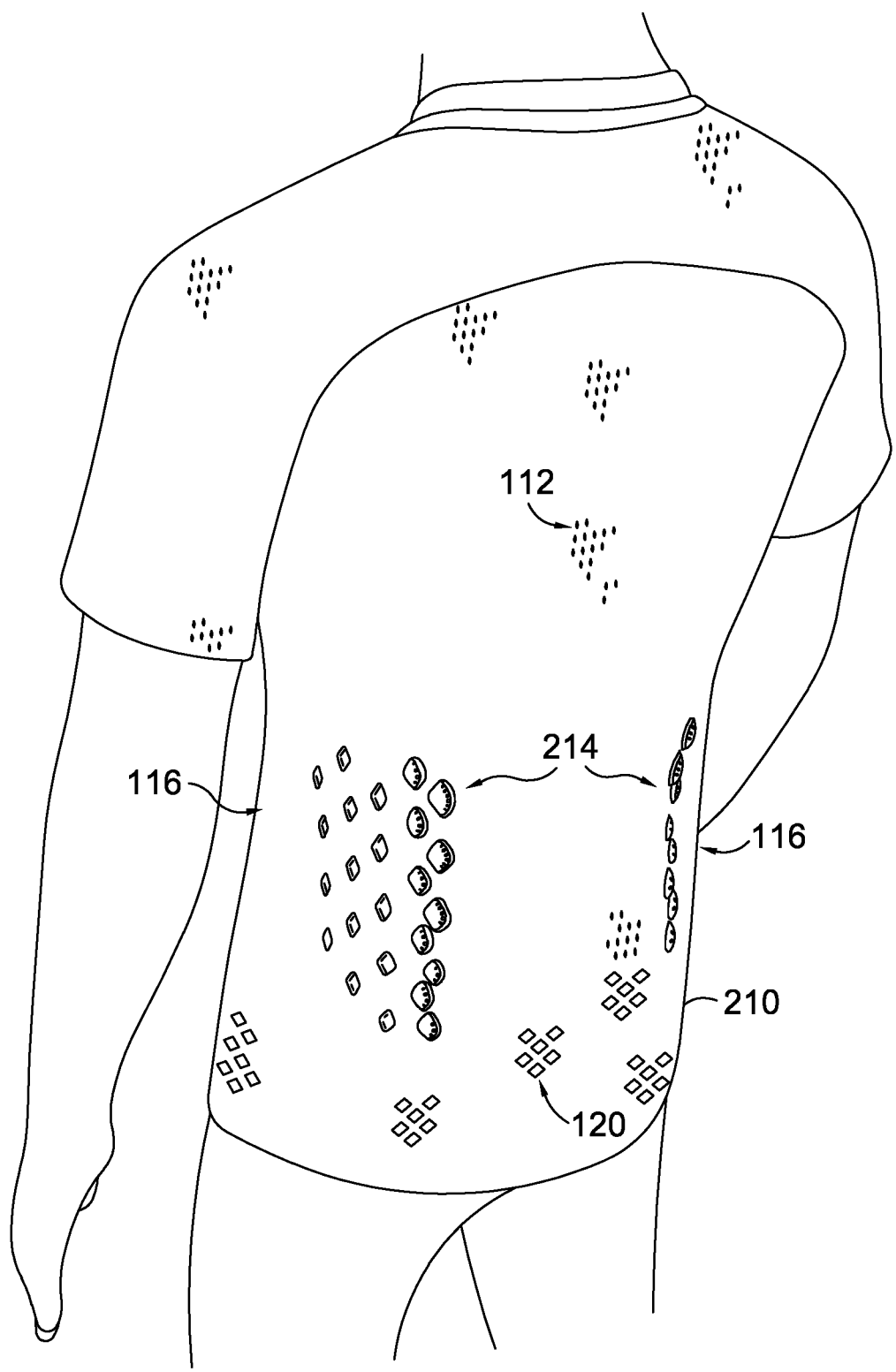
FIG. 4 illustrates a back perspective view of the exemplary apparel item of FIG. in accordance with aspects hereof.

Turning now to FIGS. 1 and 2, a front view and a back view respectively of an exemplary apparel item 100 configured to reduce the perception of cling in an un-worn configuration is illustrated in accordance with aspects herein. FIGS. 3 and 4 illustrate front and back perspective views respectively of the apparel item 100 in an as-worn state. The apparel item 100 in FIGS. 1-4 is in the form of a top having sleeves. This depiction is exemplary only, and it is contemplated that the apparel item 100 may take other forms such as a sleeveless shirt, a shirt having full-length sleeves, a jacket, and the like. Moreover, aspects described herein may be implemented in other types of apparel items such as shorts, pants, and the like. Any and all such aspects, and any variation thereof, are contemplated as being within the scope herein.

Referring now generally to FIGS. 1 and 2, as shown in FIG. 1, the apparel item 100 comprises a front portion 110. The front portion 110 is adapted to cover a front torso area of the wearer when the apparel item 100 is worn as shown in FIG. 3. And as shown in FIG. 2, the apparel item 100 further comprises a back portion 210 adapted to cover a back torso area of the wearer when the apparel item 100 is worn as shown in FIG. 4. In exemplary aspects, the front portion 110 may be affixed to the back portion 210 at one or more seams using affixing technologies known in the art such as stitching, bonding, welding, adhesives, and the like. In other exemplary aspects, the front portion 110 and the back portion 210 may be of a unitary construction such that there are little to no seams affixing the portions 110 and 210 together. The front portion 110 and the back portion 210, in exemplary aspects, may be made of a knitted material formed, for instance, through a Jacquard knitting process. In other exemplary aspects, the front portion 110 and the back portion 210 may be made of a woven material formed through a weaving process. Any and all aspects, and any variation thereof, are contemplated as being within the scope herein.

The front and back portions 110 and 210 comprise a number of different structures and/or configurations designed to help reduce the perception of cling. In an exemplary aspect, both the front portion 110 and the back portion 210 comprise a plurality of perforations 112. The perforations 112 extend through the thickness of the front portion 110 and the back portion 210 such that they provide a passage or communication path between an outer-facing surface of the front and back portions 110 and 210 and an inner-facing surface of the front and back portions 110 and 210 (i.e., a passage from the external environment to an interior environment such as the wearer's skin surface). The perforations 112 are generally located along and adjacent to a midline of the front portion 110 (e.g., a line bisecting the front portion 110 into equal right and left halves) and the midline of the back portion 210 (e.g., a line bisecting the back portion 210 into equal right and left halves), although the perforations 112 may extend to the left and right side portions of the front portion 110 and the back portion 210. As well, the perforations 112 may extend from a collar or neckline portion of the front portion 110 and the back portion 210 to a lower margin or edge of the front portion 110 and the back portion 210. The perforations 112 may also extend onto sleeve portions of the apparel item 100. Any and all such aspects, and any variation thereof, are contemplated as being within the scope herein.

The size of the perforations 112 as well as the number of perforations 112 may be variable. Further, the density of the perforations 112 may be variable. For instance, the perforations 112 may be larger in size, greater in number, and/or more densely arranged closer to the midline of the front portion 110 and the back portion 210. Moreover, the perforations 112 may be larger in size, greater in number, and/or more densely arranged in upper portions of the front portion 110 and the back portion 210 as opposed to lower portions of the front and back portions 110 and 210. This is because these areas of the front portion 110 and back portion 210 are configured to lay flat against an upper front torso area of a wearer and an upper back torso of the wearer respectively as shown in FIGS. 3 and 4, and these areas are often high heat and/or sweat-producing locations. The depictions of the perforations 112 in FIGS. 1 and 2 are exemplary only, and it is contemplated that other configurations and locations of the perforations 112 are within the scope herein.

FIG. 5 depicts a close-up view of the perforations 112 in the area indicated in FIG. 1 in accordance with aspects herein. A close-up view of the perforations 112 on the back portion 210 would be similar, and the discussion of FIG. 5 is equally applicable to the perforations 112 located on the back portion 210. As shown in FIG. 5, the perforations 112 generally have a linear or slit-like shape although other shapes are contemplated herein such as circles, ellipses, squares, triangles, and the like. The perforations 112 may be formed by incising the material used to form the apparel item 100 using, for instance, mechanical cutting, laser cutting, ultrasonic cutting, water jet cutting, and the like such that the perforations 112 extend entirely through the thickness of the material. In another aspect, the perforations 112 may be engineered into the fabric material using a knitting and/or weaving process. Any and all aspects, and any variation thereof, are contemplated as being within the scope herein.

The perforations 112 may be variably-sized with larger-sized perforations 113 being located closer to the midline of the apparel item 100 and smaller-sized perforations 115 being located away from the midline and more toward the periphery of the front portion 110 and the back portion 210. Further, as shown in FIG. 5, the perforations 112 may be greater in number and/or be arranged in a denser pattern closer to the midline of the apparel item 100 and be less densely arranged in areas located away from the midline. As discussed above, increasing the density and/or size of the perforations 112 toward the midline of the apparel item 100 helps to facilitate increased air flow in this area. This is useful considering that this portion of the apparel item 100 is generally positioned adjacent to relatively high heat-producing areas of the wearer when worn. By facilitating increased air flow in these areas, the material forming the front portion 110 and the back portion 210 may dry quicker and the wearer may cool more quickly thus helping to reduce the perception of cling.

Returning particularly to FIG. 1, the front portion 110 further comprises a first set of outwardly-projecting nodes 114. In exemplary aspects, the first set of nodes 114 may be located generally along the right and left front side portions of the front portion 110. These areas may generally correspond in part to the flank area of a wearer when the apparel item 100 is in the as-worn configuration as shown in FIG. 3. In exemplary aspects, the first set of nodes 114 may comprise between 5 to 20 ellipsoid or diamond-shaped nodes arranged in a staggered pattern as shown. In other words, the nodes 114 located closer to the midline of the front portion 110 may be offset from the nodes 114 located closer to the lateral margin of the front portion 110. The number and the patterning of the first set of nodes 114 shown in FIG. 1 is exemplary only, and it is contemplated that the first set of nodes 114 may be arranged in different types of patterns and may comprise a different number than shown in FIG. 1. Each of the first set of nodes 114 may comprise a number of apertures located along a leading edge of each node 114. In other words, the apertures may be oriented on the nodes 114 such that they face toward the midline of the front portion 110. A more detailed description of the first set of nodes 114, including the apertures, will be provided with respect to FIG. 6.

The front portion 110 also comprises a second set of inwardly-projecting nodes 116. In exemplary aspects, the second set of inwardly-projecting nodes 116 is located lateral to the first set of nodes 114 on both the right and left sides of the front portion 110. Further, in exemplary aspects, the second set of nodes 116 may extend around the sides of the apparel item 100 to the back portion 210 as shown in FIGS. 2 and 4. The second set of nodes 116, including those located on the back portion 210, may comprise between 5 and 40 in number although numbers outside of that range are contemplated herein. In exemplary aspects, the nodes 116 may comprise an ellipsoid or diamond shape although other shapes are contemplated herein. Moreover, the second set of nodes 116 may be arranged in a staggered or honeycomb-like pattern similar to the first set of nodes 114 such that nodes 116 in adjacent vertical columns are offset from one another. The number and the patterning of the second set of nodes 116 shown in FIGS. 1-4 is exemplary only, and it is contemplated that the second set of nodes 116 may be arranged in different types of patterns and may comprise a different number than shown in FIGS. 1-4. A more detailed description of the second set of nodes 116 will be provided with respect to FIG. 6.

Similar to the front portion 110, the back portion 210 of the apparel item 100 comprises a third set of outwardly-projecting nodes 214. In exemplary aspects, the third set of nodes 214 may be located generally along the right and left back side portions of the back portion 210. These areas may generally correspond in part to the flank area of a wearer when the apparel item 100 is in the as-worn configuration as shown in FIG. 4. In exemplary aspects, the third set of nodes 214 may comprise between 5 to 20 ellipsoid or diamond-shaped nodes arranged in a staggered pattern as shown. In other words, the nodes 214 located closer to the midline of the back portion 210 may be offset from the nodes 214 located closer to the lateral margin of the back portion 210. The number and the patterning of the third set of nodes 214 shown in FIG. 2 is exemplary only, and it is contemplated that the third set of nodes 214 may be arranged in different types of patterns and may comprise a different number than shown in FIG. 2. Each of the third set of nodes 214 may comprise a number of apertures located on a trailing edge of the node 214. In other words, the apertures are oriented on the nodes 214 such that they face toward a midline of the back portion 210. A more detailed description of the third set of nodes 214, including the apertures, will be provided with respect to FIG. 6.

The back portion 210 further comprises the second set of nodes 116 that wrap around from the front portion 110 of the apparel item 100. As such, the second set of nodes 116 is interposed or located between the first set of nodes 114 and the third set of nodes 214. In exemplary aspects, the second set of nodes 116 is located lateral to the third set of nodes 214 on both the right and left sides of the back portion 210. When the apparel item 100 is in the as-worn configuration as shown in FIGS. 3 and 4, the second set of nodes 116 is generally positioned adjacent to the sides of the wearer. In other words, in the as-worn configuration, the second set of nodes 116 is configured to generally be positioned adjacent to a mid-axillary line of the wearer.

Turning now to FIG. 6, a close-up view of the nodes is provided in the areas indicated in FIG. 1 in accordance with aspects herein. Because the close-up view is the same for both the front portion 110 and the back portion 210 in this area, FIG. 6 is equally applicable to both the front portion 110 and the back portion 210. The distinction between the first set of nodes 114 and the third set of nodes 214 will be noted when appropriate. FIG. 6 depicts a portion of the first/third set of nodes 114/214 and a portion of the second set of nodes 116. With respect to the first/third set of nodes 114/214, each node 114/214 may be integrally formed at least in part from the material that is used to make the front portion 110 and the back portion 210 respectively and extends or projects outward from the material surface by a first distance. In other words, each node 114/214 extends toward an external environment and away from, for instance, a wearer's skin surface when the apparel item 100 is worn. As will be explained more fully below, in one example, each node 114/214 may be formed via an embossing process and/or each node 114/214 may be formed by applying an ink containing a foaming additive to the fabric forming the apparel item 100 and activating the ink.

In exemplary aspects, each node 114/214 may extend or project outward from the material surface a distance between, for example, 2.0 mm to 4.0 mm, 2.3 mm to 3.5 mm, and/or 2.5 mm to 3.0 mm, although distances above and below these ranges are contemplated herein. Moreover, each node 114/214 may have a length, L, as measured along the long axis of the node 114/214 of between 1.5 cm to 2.5 cm, 1.75 cm to 2.25 cm, and/or between 1.9 cm and 2.1 cm, although lengths above and below these ranges are contemplated herein. Each node 114/214 may have a width, W, as measured across its short axis of between 1.0 cm to 2.0 cm, 1.2 cm to 1.8 cm, and/or between 1.4 cm to 1.5 cm, although widths above and below these ranges are contemplated herein. Further, each node 114/214 may be generally separated from an adjacent node 114/214 by distances in the range of 1.0 cm to 3.0 cm, 1.5 cm to 2.5 cm, and/or 1.9 cm to 2.1 cm, although distances greater than or less than these are contemplated herein.

In exemplary aspects, each node 114/214 may comprise a plurality of apertures 118 arranged adjacent to an edge of the node 114/214. With respect to the first set of nodes 114, the apertures 118 may be located along a leading edge of the node 114. In other words, the apertures 118 may be oriented on each node 114 to face toward a midline of the front portion 110. In other exemplary aspects, the apertures 118 may be arranged generally along a midline of the node 114, and/or generally along a trailing edge of the node 114 (i.e., oriented to face away from the midline of the front portion 110 and to face in a backward direction when the apparel item 100 is worn). Any and all aspects, and any variation thereof, are contemplated as being within the scope herein.

With respect to the third set of nodes 214, the apertures 118 may be located along a trailing edge of the node 214. In other words, the apertures 118 may be oriented on each node 214 to face toward a midline of the back portion 210. In other exemplary aspects, the apertures 118 may be arranged along a midline of the node 214, and/or along a leading edge of the node 214 (i.e., oriented to face away from the midline of the back portion 210 and to face in a forward direction when the apparel item 100 is worn). Any and all aspects, and any variation thereof, are contemplated as being within the scope herein.

The apertures 118 extend fully through the thickness of the material forming the first and third set of nodes 114 and 214 such that they provide a communication path between the external environment and an interior space when the apparel item 100 is worn. In exemplary aspects, each node 114/214 may comprise between 2 to 8 apertures, 3 to 7 apertures, and/or between 4 to 6 apertures, although numbers greater than or less than these are contemplated herein. Moreover, in exemplary aspects, the apertures 118 may have a diameter in the range of 0.5 mm to 3.0 mm, 1.0 mm to 2.75 mm, and/or between 1.9 mm and 2.1 mm, although diameters above and below these ranges are contemplated herein. Further, in exemplary aspects, the apertures 118 may have a gradation in diameter such that the aperture 118 with the largest diameter is positioned centrally on its respective node, and the apertures 118 extending away from the central aperture 118 gradually decrease in diameter as shown in FIG. 6.

Continuing with respect to FIG. 6, each node 116 of the second set of nodes 116 may be integrally formed from the material that is used to make the front portion 110 and back portion 210 and extends or projects inward from the material surface by a second distance. In other words, each node 116 extends away from an external environment and toward an interior environment such as a wearer's skin surface when the apparel item 100 is worn. As will be explained more fully below, each node 116 may be formed via a debossing process and/or each node 116 may be formed by applying an ink containing a foaming additive to the fabric forming the apparel item 100 and activating the ink.

In exemplary aspects, each node 116 may extend inward from the material surface a distance in the range of 2.0 mm to 4.0 mm, 2.3 mm to 3.5 mm, and/or 2.5 mm to 3.0 mm, although distances above and below these ranges are contemplated herein. Moreover, each node 116 may have a length, L, as measured along the long axis of the node 116 of between 1.5 cm to 2.5 cm, 1.75 cm to 2.25 cm, and/or between 1.9 cm and 2.1 cm, although lengths above and below these ranges are contemplated herein. Each node 116 may have a width, W, as measured across its short axis of between 1.0 cm to 2.0 cm, 1.2 cm to 1.8 cm, and/or between 1.4 cm to 1.5 cm, although widths above and below these ranges are contemplated herein. Further, each node 116 may be generally separated from an adjacent node 116 by distances in the range of 1.0 cm to 3.0 cm, 1.5 cm to 2.5 cm, and/or 1.9 cm to 2.1 cm, although distances greater than or less than these are contemplated herein. In exemplary aspects, the nodes 116 may not comprise apertures such as the apertures 118 located on the first set of nodes 114 and the third set of nodes 214. A description of the function of the nodes 114, 116, and 214 will be discussed later.

Figure 7A:
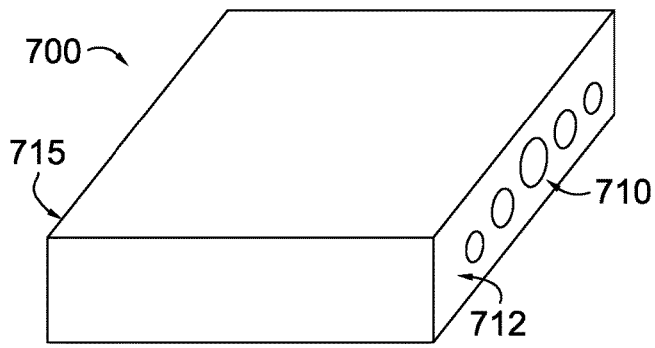
FIG. 7A illustrates a view of another exemplary node structure in accordance with aspects herein.

The ellipsoid or diamond shape of the first, second, and third sets of nodes 114, 116, and 214 is exemplary only and other shape configurations are contemplated herein. For instance, FIG. 7A depicts an alternative shape configuration for the first and third set of nodes 114 and 214 and is referenced generally by the numeral 700. The node 700 may comprise more of a square-like cuboid shape having distinct edges and faces. The dimensions of the node 700 may be generally similar to the dimensions for the nodes 114, 116, and 214. For instance, the node 700 may extend from the fabric surface a distance in the range of 2.0 mm to 4.0 mm, 2.3 mm to 3.5 mm, and/or 2.5 mm to 3.0 mm, and may have a length/width in the range of 1.0 cm to 2.7 cm, 1.5 cm to 2.5 cm, 1.75 cm to 2.25 cm, and/or between 1.9 cm and 2.1 cm. For example, a length extending between a face 712 and an opposite surface 715 may be 1.0 cm to 2.7 cm, 1.5 cm to 2.5 cm, 1.75 cm to 2.25 cm, and/or between 1.9 cm and 2.1 cm, in an exemplary aspect. Dimensions provided in association with node 700 that are above and below these ranges are contemplated herein. Apertures 710 may be located on the face 712 of the node 700 that is oriented toward the midline of the front portion 110 with respect to the first set of nodes 114 and toward the midline of the back portion 210 with respect to the third set of nodes 214. Similar to the apertures 118, the apertures 710 may vary in number and may have a gradation in diameter within the ranges set forth for the apertures 118. The shape configuration depicted for the node 700 may also be used for the second set of nodes 116 excluding, for instance, the apertures 710. Additional shape configurations are contemplated herein for the first, second, and third set of nodes 114, 116, and 214 respectively. For instance, the nodes 114, 116, and 214 may have more of a hemispherical configuration, a prism configuration, a rectangular cuboid-shaped configuration, conical configuration, octahedron configuration, tetrahedron configuration, cylindrical configuration, and the like. Further, the orientation of each of the node configurations relative to the fabric and/or the wearer when worn may be varied to achieve varied results as contemplated herein.

Figure 7B:
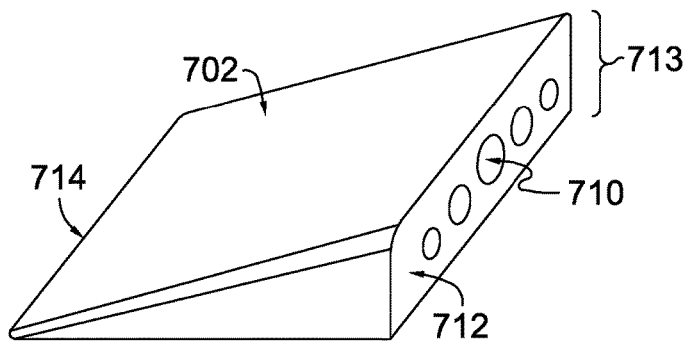
FIG. 7B illustrates a view of another exemplary node structure having a tapered structure in accordance with aspects herein.

FIG. 7B is a view of another exemplary node structure having a tapered structure in accordance with aspects herein and generally referred to by the numeral 702. The node 702 may comprise more of a wedge-like triangular prism shape having distinct edges, faces, and a tapered profile. The dimensions of the node 702 may be generally similar to the dimensions for the nodes 114, 116, and 214. For instance, the node 702 may extend from the fabric surface proximate the face 712 a distance 713 in the range of 2.0 mm to 4.0 mm, 2.3 mm to 3.5 mm, and/or 2.5 mm to 3.0 mm. However, at an opposite end at a tapered edge 714, the node 702 extends a lesser distance than distance 713. For example, it is contemplated that the tapered edge 714 converges with the fabric and therefore the node 702 is flush with the fabric at the tapered edge 714, in an exemplary aspect. Alternatively, it is contemplated that the tapered edge 714 extends from the fabric a distance of less than 1 mm, in an exemplary aspect. Similar to previously described node configuration, the node 702 may have a length/width in the range of 1.0 cm to 2.7 cm, 1.5 cm to 2.5 cm, 1.75 cm to 2.25 cm, and/or between 1.9 cm and 2.1 cm. For example, a length extending between the face 712 and the tapered edge 714 may be 1.0 cm to 2.7 cm, 1.5 cm to 2.5 cm, 1.75 cm to 2.25 cm, and/or between 1.9 cm and 2.1 cm, in an exemplary aspect. Dimensions provided in association with node 702 that are above and below these ranges are contemplated herein. Apertures 710 may be located on the face 712 of the node 702 that is oriented toward the midline of the front portion 110 with respect to the first set of nodes 114 and toward the midline of the back portion 210 with respect to the third set of nodes 214. Similar to the apertures 118, the apertures 710 may vary in number and may have a gradation in diameter within the ranges set forth for the apertures 118. The shape configuration depicted for the node 702 may also be used for the second set of nodes 116 excluding, for instance, the apertures 710.

Figure 7C:
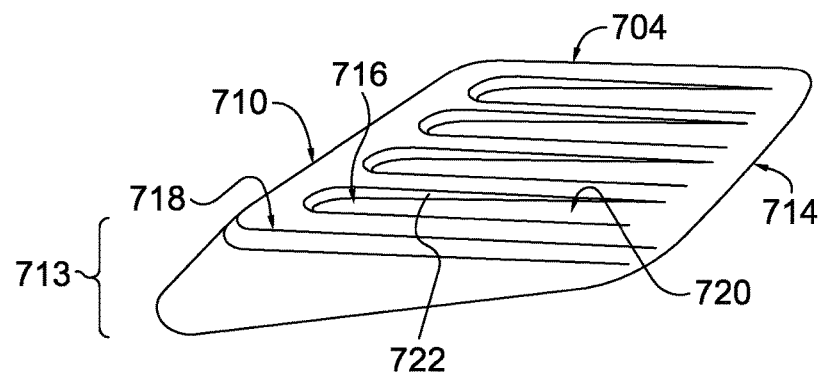
FIG. 7C illustrates a view of another exemplary node structure having a tapered and exterior channeled structured in accordance with aspects herein.

FIG. 7C is a view of another exemplary node structure having a tapered structure with an exterior channel structure in accordance with aspects herein and generally referred to by the numeral 704. Like the node 702, the node 704 may comprise more of a wedge-like triangular prism shape having distinct edges, faces, and a tapered profile. The dimensions of the node 704 may be generally similar to the dimensions for the node 702. For instance, the node 704 may extend from the fabric surface proximate the face (not shown, but the surface on which apertures 710 are located) a distance in the range of 2.0 mm to 4.0 mm, 2.3 mm to 3.5 mm, and/or 2.5 mm to 3.0 mm. However, at an opposite end at the tapered edge 714, the node 704 extends a lesser distance than the distance at the face. For example, it is contemplated that the tapered edge 714 converges with the fabric and therefore the node 704 is flush with the fabric at the tapered edge 714, in an exemplary aspect. Alternatively, it is contemplated that the tapered edge 714 extends from the fabric a distance of less than 1 mm, in an exemplary aspect. Similar to previously described node configuration, the node 704 may have a length/width in the range of 1.0 cm to 2.7 cm, 1.5 cm to 2.5 cm, 1.75 cm to 2.25 cm, and/or between 1.9 cm and 2.1 cm. For example, a length extending between the face and the tapered edge 714 may be 1.0 cm to 2.7 cm, 1.5 cm to 2.5 cm, 1.75 cm to 2.25 cm, and/or between 1.9 cm and 2.1 cm, in an exemplary aspect.

The node 704 is depicted having a plurality of channels 716. In this optional configuration, the plurality of channels extend from a top surface 718 of the node 704 to a channel surface 720 that, in this example, is recessed from the top surface 718. However, it is also contemplated that one or more of the channels 716 extend beyond the top surface 718 as embossed rather than the depicted debossed configuration. The plurality of channels may align with the one or more apertures 710 to provide structural integrity to the node 704 and/or direct air movement relative to the apertures 710, in exemplary aspects. While a variety of configurations are contemplated for the plurality of channels 716, an exemplary configurations is provided having a tapered channel wall 722 that has a greater depth of recession proximate the face and a lesser depth of recession proximate the tapered edge 714. This tapered channel wall 722 configuration may provide fluid flow characteristics that assist in achieving aspects provided herein.

Dimensions provided in association with node 704 that are above and below these ranges are contemplated herein. Apertures 710 may be located on the face of the node 704 that is oriented toward the midline of the front portion 110 with respect to the first set of nodes 114 and toward the midline of the back portion 210 with respect to the third set of nodes 214. Similar to the apertures 118, the apertures 710 may vary in number and may have a gradation in diameter within the ranges set forth for the apertures 118. The shape configuration depicted for the node 704 may also be used for the second set of nodes 116 excluding, for instance, the apertures 710. Further, the face of the node 704 is depicted having an angled surface relative to the underlying fabric (non-perpendicular). This angled approach of the face may provide for fluid flow characteristics that achieve aspects provided herein. As such, it is contemplated that a variety of node configuration may be implemented in various sizes, orientations, and structures to achieve aspects provided herein.

Figure 8:
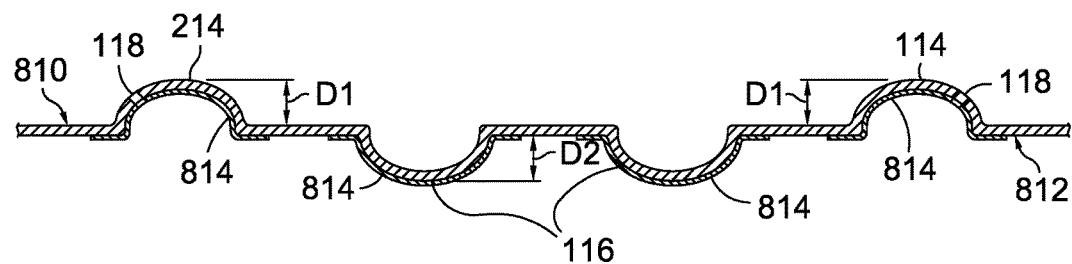
FIG. 8 illustrates a cross-sectional view taken along line 8-8 of FIG. 1 and illustrates outwardly-projecting and inwardly-projecting nodes in accordance with aspects hereof.

FIG. 8 illustrates a cross-section of the apparel item 100 taken along cut line 8-8 of FIG. 1 in accordance with aspects herein. As shown, the apparel item 100 comprises an outer-facing surface 810 and an inner-facing surface 812 of a fabric material used to form the apparel item 100. In exemplary aspects, the inner-facing surface 812 is adapted to face toward, for example, a wearer's skin surface and/or a base layer worn under the apparel item 100, while the outer-facing surface 810 is adapted to face toward the external environment and/or an outer layer worn over the apparel item 100. The fabric material comprises a base contact level without the nodes 114, 116, and 214.

Continuing, cross-sections are shown for the first set of nodes 114, the second set of nodes 116, and the third set of nodes 214. As described above, the first set of nodes 114 and the third set of nodes 214 extend or project outward from the base contact level of the fabric material a first distance, $D_1$, while the second set of nodes 116 extend or project inward from the base contact level of the fabric material a second distance, $D_2$. The first distance and the second distance may, in exemplary aspects, be the same or different. The apertures 118 of the first set of nodes 114 are oriented to face in a forward direction (e.g., toward the front midline of the apparel item 100), and the apertures 118 of the third set of nodes 214 are oriented to face in a backward direction (e.g., toward the back midline of the apparel item 100) when the apparel item 100 is in the as-worn configuration.

In one exemplary aspect, and as further shown in FIG. 8, the inner-facing surfaces 812 of each of the nodes 114, 116, and 214 may be reinforced with a heat-activated reinforcement material 814. In exemplary aspects, the reinforcement material 814 comprises a polyurethane or thermoplastic polyurethane material that is heat bonded to the inner-facing surfaces 812 of the nodes 114, 116, and 214. The reinforcement material 814 may be bonded during an embossing process used to form the first and third set of nodes 114 and 214 and during a debossing process used to form the second set of nodes 116. This process will be explained in greater depth below. The reinforcement material 814 helps to provide structural integrity to the nodes 114, 116, and 214 so that the nodes 114, 116, and 214 are self-standing and are able to withstand daily wear-and-tear including washings. As shown in FIG. 8, the apertures 118 extend through the thickness of the reinforcement material 814. Since the reinforcement material 814 is located on the inner-facing surface 812 of the apparel item 100, the reinforcement material 814 may be processed to have a soft hand so as to be comfortable against the skin of the wearer. For example, the reinforcement material 814 may comprise polyurethane (PU), thermoplastic polyurethane (TPU) film and/or the like. The texture of the reinforcement material 814 may be augmented through the texture of a carrier paper on which the reinforcement material 814 is formed. For example, the PU or TPU may be extruded onto a carrier paper and the surface of the PU or TPU in contact with the carrier paper may take on a similar surface structure as that of the carrier paper. In particular, a texture on the carrier paper may be used to transfer the texture to the film (e.g., to achieve a buckskin-like texture on the film having a soft hand), in an exemplary aspect. As such, a texture and feel may be manipulated as part of the material formation, forming/molding, or other processes steps.

Figure 9:
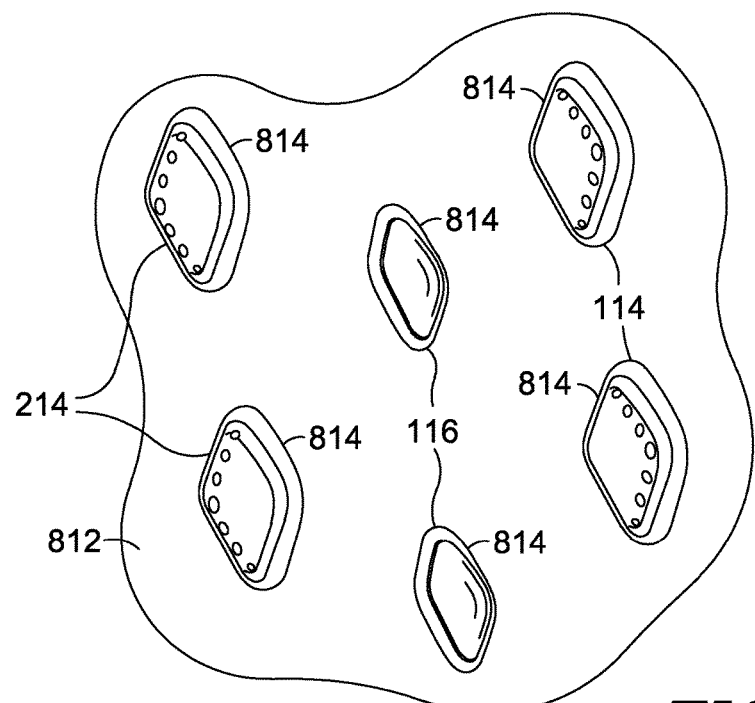
FIG. 9 illustrates an inner-facing view of an exemplary set of outwardly-projecting and inwardly-projecting nodes in accordance with aspects hereof.

FIG. 9 depicts an exemplary inner-facing view of the nodes 114, 116, and 214 in accordance with aspects herein. This view is exemplary only, and it is contemplated that there may be a greater number of nodes 116 located between the first set of nodes 114 and the third set of nodes 214. As shown, each of the first, second, and third sets of nodes 114, 116 and 214 respectively has reinforcement material 814 bonded to its inner-facing surface 812. In general, the reinforcement material 814 comprises discrete segments, where each segment is associated with a particular node 114, 116, or 214. Having discrete portions of reinforcement material 814 as opposed to a continuous sheet overlaying the nodes 114, 116, and 214 provides more flexibility, improved breathability and permeability, and a better feel to that portion of the apparel item 100 comprising the nodes 114, 116, and 214. As shown, the reinforcement material 814 for each node 114, 116, and 214 is generally formed such that it extends beyond the boundaries of the underlying node 114, 116, and 214. This ensures, for example, that during the embossing and debossing process, no part of the node 114, 116, and 214 is left without reinforcement material 814, which further contributes to the structural integrity and self-standing nature of the nodes 114, 116 and 214.

Figure 10:
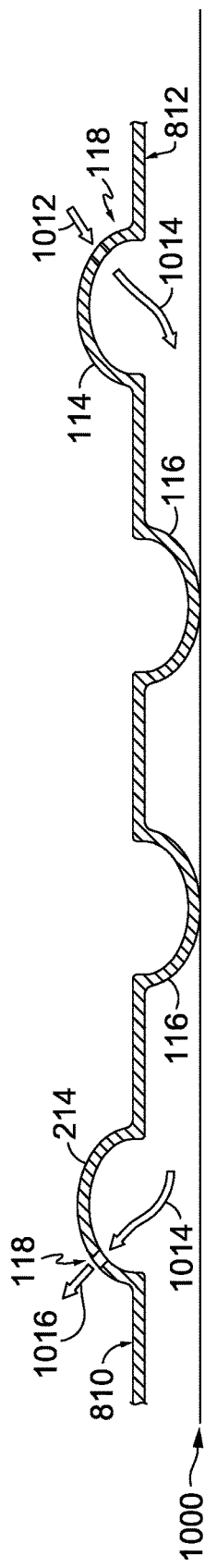
FIG. 10 illustrates a cross-sectional view taken along line 8-8 of FIG. 1 and illustrates an air flow path between outwardly-projecting nodes, inwardly-projecting nodes, and a wearer's skin surface in accordance with aspects hereof.

FIG. 10 is a side view of a portion of the apparel item 100 comprising the nodes 114, 116, and 214 in relation to a skin surface of the wearer's skin 1000 of a wearer in accordance with aspects herein. The nodes 114, 116, and 214 are shown without the reinforcement material 814, although it is contemplated that the nodes 114, 116 and 214 may comprise the reinforcement material 814. FIG. 10 is provided to illustrate how the nodes 114, 116, and 214 act to reduce the perception of cling by the wearer. As a first example, and as illustrated in FIG. 10, use of the nodes 114, 116, and 214 decreases the amount of contact between the fabric material used to form the apparel item 100 and the wearer's skin 1000 in the area where the nodes 114, 116, and 214 are located. In particular, the second set of inwardly-projecting nodes 116 helps to lift the base contact level of the fabric material used to form the apparel item 100 away from the wearer's skin 1000. As such, in the areas where the nodes 116 are located, the only contact between the apparel item 100 and the wearer's skin 1000 may be limited to the apexes of the nodes 116. By reducing the amount of contact between the fabric material forming the apparel item 100 and the wearer's skin 1000, the fabric material is less likely to absorb perspiration produced by the wearer's skin 1000. This helps to keep the apparel item 100 from becoming weighted down with perspiration and clinging to the wearer.

The nodes 114, 116, and 214 further act to reduce the perception of cling by the wearer by facilitating air flow between the external environment and the space between the apparel item 100 and the wearer's skin 1000. For instance, the apertures 118 on the first set of nodes 114 are oriented to face toward a front midline of the apparel item 100. Physical movements by the wearer such as running often cause air to flow over the front over the wearer's torso. By orienting the apertures 118 on the first set of nodes 114 to face toward the front midline of the apparel item 100, the air may flow into the apertures 118 as indicated by the arrow 1012. Moreover, by having the first set of nodes 114 project outward from the fabric surface, the nodes 114 are better positioned to capture and channel this air flow as opposed to apertures that lay flat against the surface of the apparel item 100.

Once channeled by the apertures 118 on the first set of nodes 114, the air enters into a space or void created by the inwardly-projecting second set of nodes 116 as indicated by the arrow 1014. More specifically, because the nodes 116 project inward, the nodes 116 create channels or passages in the space between the inner-facing surface 812 of the apparel item 100 and the wearer's skin 1000. Air flowing through the passages or channels created by the nodes 116 and the wearer's skin 1000 helps to cool the wearer and may also effect drying of the apparel item 100 helping to reduce the perception of cling. In one aspect, the air may exit this space by leaving through the apertures 118 located on the third set of nodes 214 as indicated by the arrow 1016.

Moreover, air flow within the channels or passages created between the inner-facing surface 812 of the apparel item 100 and the wearer's skin 1000 by the nodes 116 may be heated by the wearer's intrinsic body heat. The air may also pick up moisture vapor produced by the wearer's body. As the air is heated it may increase in volume and become more buoyant which may force the air out of the apertures 118 of the first and third set of nodes 114 and 214 carrying the moisture vapor with it which further helps to cool the wearer, dry the apparel item, and reduce the perception of cling.

Turning back to FIGS. 1 and 2, the front portion 110 and the back portion 210 of the apparel item 100 may further comprise a plurality of integrated offset structures 120 located generally within the boundaries defined by the dotted line 122, the right and left margins of the apparel item 100 and the lower or bottom margins of the front portion 110 and the back portion 210, although it is contemplated herein that the integrated offset structures 120 may extend outside of this area. The integrated offset structures 120 are generally located on an inner-facing surface of the front portion 110 and the back portion 210, although an indication of the integrated offset structures 120 may appear on the outer-facing surface of the apparel item 100 as shown, for example, in FIGS. 1 and 2. A better view of the integrated offset structures 120 is shown in FIGS. 11 and 12.

Figure 11:
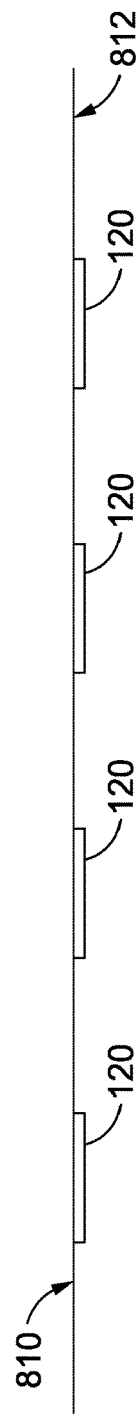
FIG. 11 illustrates a cross-sectional view taken along line 11-11 of FIG. 1 and illustrates integrated offset structures in accordance with aspects hereof.

FIG. 11 is a cross-section taken along line 11-11 of FIG. 1 in accordance with aspects herein and is referenced generally by the numeral 1100. FIG. 11 illustrates the outer-facing surface 810 of the apparel item 100 and the inner-facing surface 812 of the apparel item 100. The plurality of integrated offset structures 120 are shown extending inwardly from the inner-facing surface 812. When the front and back portions 110 and 210 are formed through a knitting process, such as a Jacquard knitting process, the Jacquard knitting machine may be programmed to alter the stitch pattern in the areas indicated in FIGS. 1 and 2 to create the integrated offset structures 120. For instance, additional stitches may be added to create the integrated offset structures 120. Similarly, if the front portion 110 and the back portion 210 are formed through a weaving process, the weaving device may be programmed to alter the weave pattern in the areas indicated in FIGS. 1 and 2 to create the integrated offset structures 120. The integrated offset structures 120 extend away from the inner-facing surface 812 of the apparel item 100 in the range of 0.25 mm to 1.5 mm, 0.5 mm to 1.25 mm, and/or 0.75 mm to 1.0 mm, although distances greater than or lesser than these values are contemplated as being within the scope herein.

Figure 12:
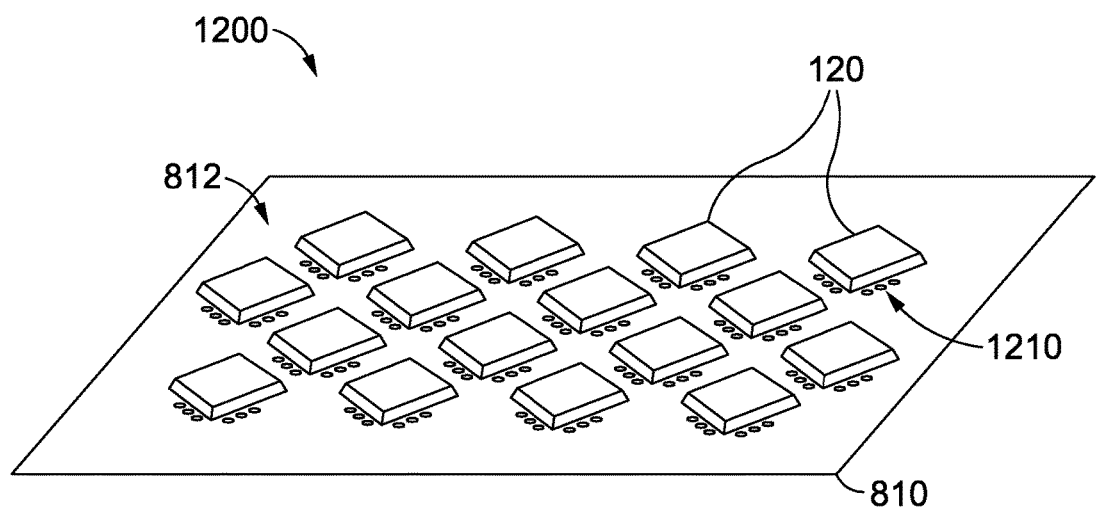
FIG. 12 illustrates an inner-facing view of the integrated offset structures of FIG. 10 in accordance with aspects hereof.

FIG. 12, referenced generally by the numeral 1200, is a perspective view of the inner-facing surface of the apparel item 100 in the areas comprising the integrated offset structures 120 and is used to illustrate the shape configuration and patterning of the integrated offset structures 120 in accordance with aspects herein. As shown, the integrated offset structures 120 may be configured in a diamond shape although other shape configurations are contemplated herein such as circles, triangles, squares, and the like. Each offset structure 120 may generally have a length and width in the range of 3.0 mm to 1.0 cm, 4.0 mm to 8.0 mm, and/or 5.0 mm to 7.0 mm, although lengths and widths greater than or lesser than these values are contemplated herein.

The integrated offset structures 120 may be arranged in a repeating pattern where offset structures 120 in one row are offset or staggered from the offset structures 120 in an adjacent row. Each offset structure 120 may be separated from an adjacent offset structure 120 by distances in the range of 1.0 mm to 5.0 mm, 1.1 mm to 4.0 mm, and/or 1.2 mm to 3.0 mm, although distances greater than or less than these values are contemplated herein.

In exemplary aspects, the integrated offset structures 120 may be knit or woven to comprise a set of apertures 1210 located generally along a lower or inferior portion of the integrated offset structures 120 when the apparel item 100 is in an as-worn configuration. The apertures 1210 may impart a degree of permeability or breathability to the integrated offset structures 120 to potentially offset the increased thickness of the material in the areas where the integrated offset structures 120 are located.

The dimensions associated with the integrated offset structures 120 along with the patterning of the integrated offset structures 120 help to decrease the amount of contact between the inner-facing surface 812 of the apparel item 100 and, for instance, the wearer's skin when the apparel item 100 is in an as-worn configuration. To put it another way, when the apparel item 100 is worn, the integrated offset structures 120 generally contact the skin in the areas designated in FIGS. 1 and 2, but those portions of the material located between the integrated offset structures 120 are held away from the wearer's skin thus effectively reducing the surface area of the material coming into contact with the wearer's skin. As explained above, this may help to reduce the perception of cling by decreasing the surface area available to absorb perspiration.

Figure 13:
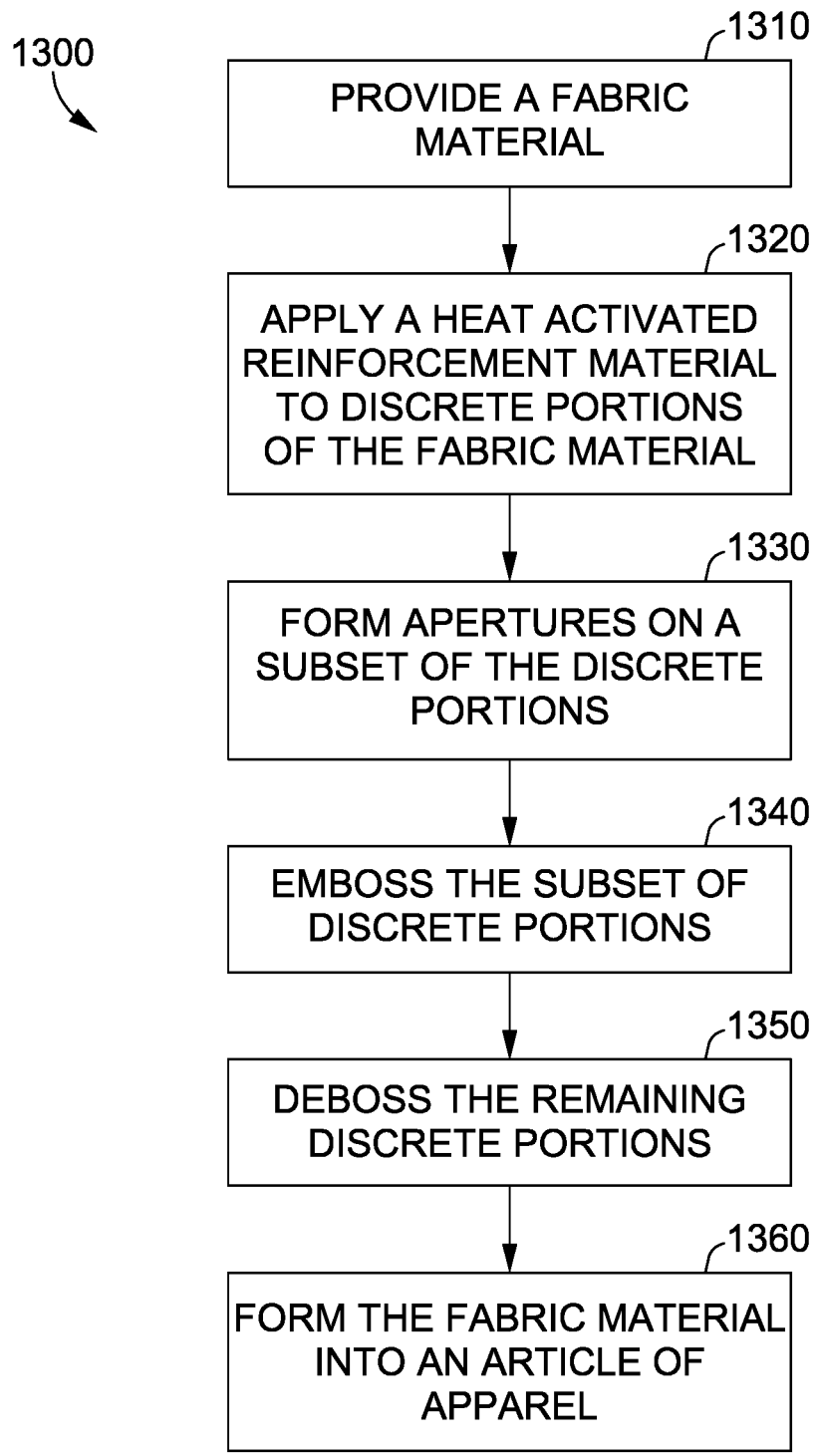
FIG. 13 illustrates a flow diagram of an exemplary method of forming an apparel item configured to reduce the perception of cling in accordance with aspects hereof.

Turning now to FIG. 13, FIG. 13 depicts a flow diagram of a first exemplary method 1300 of manufacturing an apparel item, such as the apparel item 100, configured to reduce the perception of cling in accordance with aspects herein. At a step 1310, a fabric material having a first surface and a second surface is provided. The fabric material may be cut to form, for instance, a front portion and a back portion of an apparel item such as the front portion 110 and the back portion 210 of the apparel item 100. Alternatively, it is contemplated that other formation techniques may be implemented. For example, seamless knitting or weaving may be used in whole or in part to form at least portions of the garment. Further, it is contemplated, as will be discussed hereinafter, that structures may be formed integrally or as a post process to the formation of an underlying article. Therefore, while exemplary aspects are discussed specifically herein, alternative options are contemplated.

In exemplary aspects, the fabric material may comprise a knit or woven material that is knitted or woven to have a relatively tight pattern, as opposed to more of a mesh-like pattern. This helps to provide structural integrity to apparel items formed from the fabric material allowing the apparel items to withstand high amounts of wear-and-tear. However, although this may result in a sturdy apparel item, the apparel item may lack some of the breathability/permeability characteristics of apparel items formed from more mesh-like materials, hence the need to configure the apparel item to comprise some or all of the structures and configurations described herein.

In exemplary aspects, the fabric material may be knitted or woven to form integrated offset structures, such as the integrated offset structures 120, extending from the back side of the fabric material. For instance, when knitted using a Jacquard knitting machine, the integrated offset structures may be formed in selected portions of the fabric material by adding extra stitches to offset the structures from the base contact level of the fabric material. Additionally or alternatively, it is contemplated that the integrated offset structures 120 may be formed from molding processes, such as an integrated TPU material (e.g., yarn) that is heat formed into a desired structure, such as an offset structure. Further, it is contemplated that one or more manufacturing techniques may be implemented to integrally form the integrated offset structures 120. For example, the structures may be integrally knit or woven into the material with techniques and equipment able to achieve flat knit, circular knit, woven, and the like.

At a step 1320, a plurality of discrete heat-activated reinforcement material segments are applied to the second surface of the fabric material at discrete portions of the fabric material using, for example, an adhesive located on one surface of the reinforcement material segments. In exemplary aspects, the reinforcement material segments may be on a carrier sheet, and the carrier sheet may then be applied to the second surface of the fabric material in selected portions of the fabric material.

When applied to the front portion and the back portion cut from the fabric material, the reinforcement material segments are applied to what will be the inner-facing surface of these portions. In exemplary aspects, the reinforcement material segments may comprise a polyurethane or thermoplastic polyurethane film although other heat-activated films are contemplated herein. Further, the heat-activated reinforcement material segments may be processed to produce a soft hand to the surface of the reinforcement material segments as these segments may come into contact with the wearer's skin when the apparel item is worn. While application of a film is provided in this exemplary aspect, it is contemplated that alternative methods and techniques may be used to achieve the creation of one or more embossed and/or debossed nodes. For example, knitting technique, weaving techniques, knitting machines, weaving machines, integrated materials (e.g., PU, TPU), molding, activating, pressing, and/or other forming techniques may be used in any combination to achieve the structures and/or results as provided and contemplated herein. Another exemplary method of forming the nodes is provided below with respect to FIG. 14 and FIGS. 15A-15D.

At a step 1330, apertures, such as the apertures 118, may be formed on subsets of the fabric material comprising the heat-activated reinforcement material segments. In exemplary aspects, a mechanical cutter, a laser cutter, an ultrasonic cutter, a water-jet cutter, and the like may be used to form the apertures. The apertures may be formed through both the fabric material and the reinforcement material segments.

At a step 1340, an embossing process is applied to those portions of the fabric material comprising the heat-activated reinforcement material segments and the apertures. In exemplary aspects, the embossing process comprises applying pressure via a heated mold to the second surface of the fabric material in those portions of the fabric material comprising the heat-activated reinforcement material segments and the apertures to bond the reinforcement material segments to the fabric material while imparting a three-dimensional shape to those portions. The embossing process may be used to form, for example, the first set of nodes 114 and the third set of nodes 214 discussed above.

At a step 1350, a debossing process is applied to those portions of the fabric material comprising the heat-activated reinforcement material segments without the apertures. In exemplary aspects, the debossing process comprises applying pressure via a heated mold to the first surface of the fabric material in those portions of the fabric material comprising the heat-activated reinforcement material segments without the apertures to bond the reinforcement material segments to the fabric material while imparting a three-dimensional shape to those portions. The debossing process may be used to form, for example, the second set of nodes 116.

At a step 1360, the fabric material may be formed into the apparel item. For example, when the fabric material is cut to form a front portion and a separate back portion, the front portion may be affixed to the back portion at one or more seams. In other exemplary aspects, the fabric material may comprise an engineered fabric having a front portion integrally formed with the back portion with no seams.

Additional manufacturing steps are contemplated herein in exemplary aspects. For instance, perforations, such as the perforations 112, may be formed in selected portions of the fabric material using mechanical cutters, laser cutters, ultrasonic cutters, water-jet cutters, and the like. In other exemplary aspects, the perforations may be integrally knitted or woven into the fabric material. Additionally, while the steps are depicted as discrete serial steps, it is contemplated that two or more steps may be performed in parallel. For example, the embossing of step 1340 and the debossing of step 1350 may be performed simultaneously, such as through a common forming structure (e.g., a mold or dimensioned press). Further, it is contemplated that one or more steps may be omitted completely while still achieving aspects provided herein. For example, the step 1320 may be omitted and instead the provided fabric material from step 1310 may have integrated materials that serve as reinforcement material to discrete portions. As provided herein, it is contemplated, for example, that the fabric includes TPU (or similar materials) that are capable of serving as a heat activated reinforcement material without subsequent application of such materials to serve as forming and reinforcement materials, for example.

Figure 14:
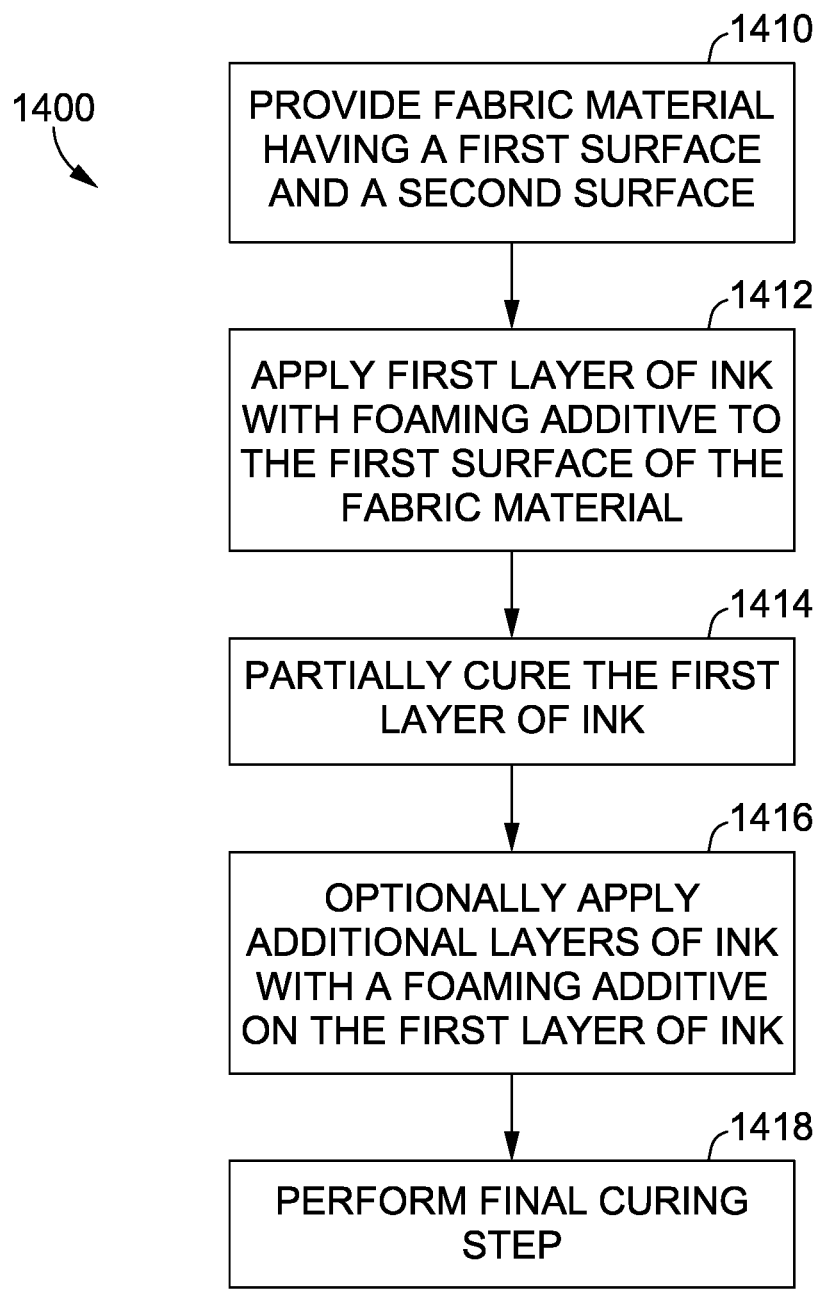
FIG. 14 illustrates a flow diagram of an exemplary method of forming nodes on an apparel item in accordance with aspects hereof.

FIG. 14 depicts a flow diagram of another exemplary method for forming nodes such as the nodes 114, 116, and 214 of FIGS. 1-4. At a step 1410, a fabric material is provided, where the fabric material has a first surface and a second surface opposite of the first surface.

At a step 1412, at least a first layer of ink having a foaming additive is printed on or applied to at least a portion of the first surface of the fabric material, where the first layer of ink is applied at one or more discrete portions of the fabric material. In exemplary aspects, the ink may be applied by utilizing a screen printing process, a 2-D printing process, a 3-D printing process, manual application, and the like. In some exemplary aspects, prior to applying the first layer of ink, an optional primer layer may be applied to the first surface, where the primer layer may comprise a clear silicone-based layer with or without a foaming additive. When used, the primer layer may be partially cured before the method 1400 continues.

At a step 1414, the first layer of ink is partially cured to help activate the foaming additive and to help at least partially set the ink formulation. The method 1400 may further comprise at a step 1416, optionally applying one or more additional layers of ink/foaming additive formulations on top of the first layer, where each layer is partially cured before application of the next layer. Each of the layers, including the primer layer when used, may be applied in a different pattern or the same pattern as the preceding layer. Further, each of the layers may occupy a smaller surface area than the preceding layer such that the top layer occupies the smallest surface area compared to the other layers. In exemplary aspects, the partial-curing step may comprise exposing the ink/foaming additive formulation to a predefined temperature for a predefined period of time. Different temperatures and/or different time periods may be used for each layer or the same temperature and time period may be used for each layer. Any and all aspects, and any variation thereof, are contemplated as being within the scope herein. In exemplary aspects, an optional top layer that may or may not have a foaming additive may be applied to help seal the resulting foam node and/or to impart a soft feel or texture to the node since the top layer may be in contact with a wearer's skin surface. Once all the layers have been applied, a final curing step may be done at a step 1418 to fully set the node and to complete the activation of the foaming additive. The final curing step may be at a different temperature and time period than the partial curing steps (e.g., at a higher temperature and for a longer period of time). In exemplary aspects, the partial-curing steps and the final curing step may be achieved using modalities such as infra-red light, ultrasound, radio-frequency waves, chemicals, water, ultra-violet lights, and the like. Any and all aspects, and any variation thereof, are contemplated as being within the scope herein.

The method 1400 further contemplates forming one or more foam nodes on one or more discrete portions of the second surface of the fabric material. The method 1400 may further comprise perforating some or all of the foam nodes via, for instance, a mechanical process, laser cutting, water-jet cutting, ultrasonic cutting, and the like.

Figure 15A:
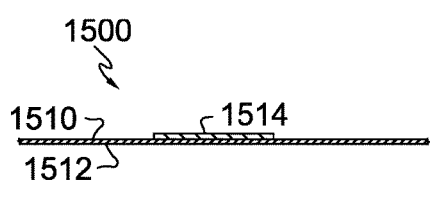
FIG. 15A-15D illustrate cross-sectional views of a process for forming exemplary nodes in accordance with aspects hereof.

A visual depiction of this process is shown in FIGS. 15A-15D in accordance with aspects herein. FIG. 15A illustrate a cross-sectional view of a base material 1500 having an inner-facing surface 1510 and an outer-facing surface 1512 in accordance with aspects herein. Although the process below is described for the application of an ink having a foaming additive to the inner-facing surface 1510, it is contemplated herein that the application could also be to the outer-facing surface 1512 (or both the inner-facing surface 1510 and the outer-facing surface 1512). The base material 1500 may, in exemplary aspects, have a weight between 130 gsm and 300 gsm (i.e., may be formed of a lightweight material).

Figure 15B:
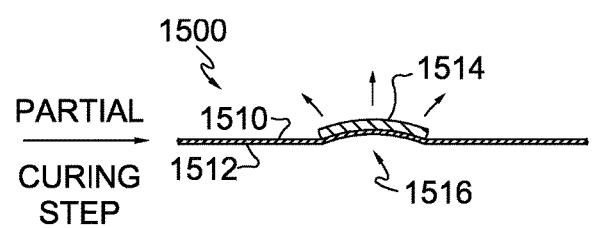

A first layer 1514 of ink having a foaming additive is printed on to the inner-facing surface 1510 of the base material 1500. A partial-curing step (e.g., a flash-curing step) is then carried out as indicated by the arrow to help set the ink and to begin activation of the foaming additive. FIG. 15B illustrates the base material 1500 after the initial curing step. The first layer 1514 has expanded in all directions (e.g., in an x-direction, a y-direction, and a z-direction) due to activation of the foaming additive by the heat as indicated by the arrows in FIG. 15B. As such, the first layer 1514 extends convexly away from the inner-facing surface 1510. Because the layer 1514 is adhered to the underlying base material 1500, as the layer 1514 expands in all directions, it may "lift" the underlying base material 1500. This may be possible due to the lightweight and elastic nature of the material. The result is that the base material 1500 "puckers" to form a debossed region 1516 on the outer-facing surface 1512 of the base material 1500. As shown, the debossed region 1516 extends concavely away from the outer-facing surface 1512 of the base material 1500. In exemplary aspects, the specific formulation of the ink and/or foaming additive, parameters associated with the curing or activation process, as well as the application pattern may be selected to achieve this deboss effect.

Figure 15C:
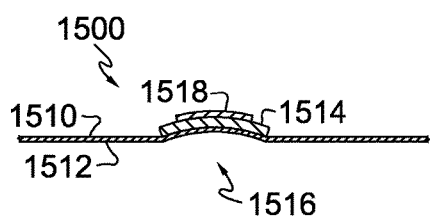
Figure 15D:
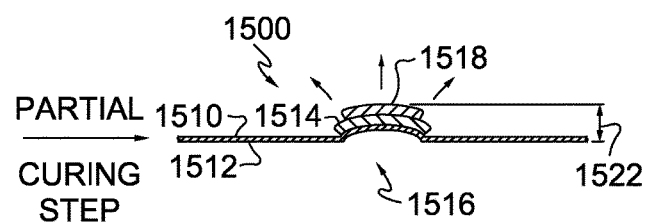

FIG. 15C illustrates the base material 1500 at a point when a second layer 1518 of ink having a foaming additive (which may be the same formulation or a different formulation than the first layer 1514) is printed on to the surface of the first layer 1514 of partially cured ink. A second partial-curing step (e.g., a flash-curing step) is then carried out as indicated by the arrow. FIG. 15D illustrates the base material 1500 after the second curing step. The second layer 1518 has expanded in all directions (as indicated by the arrows) due to the activation of the foaming additive by the heat. The activation of the second layer 1518 may cause further lifting or puckering of the underlying base material 1500 to increase the amount of offset associated with the debossed region 1516. Moreover, the degree of puckering or degree of deboss of the base material 1500 may be more pronounced in areas corresponding to the second layer 1518. Thus, by varying the application patterns for the different layers of a particular foam nodes, the shape of the deboss pattern may be sculpted or modified so that greater deboss is achieved in areas corresponding to multiple layers of ink/foaming additive and lesser deboss is achieved in areas corresponding to single layers of the ink/foaming additive formulation. After all the layers have been applied, a final curing step may be carried out to set the ink and to optionally complete activation of the foaming additive.

The height of the debossed region 1516 when combined with the height of the first and second layers 1514 and 1518 (and/or optional additional layers) may create a total stand-off height for the resulting node between a desired range as indicated above when describing the nodes 114, 116, and 214. It is contemplated herein that additional layers of ink with a foaming additive may be added, while balancing comfort to the wearer, to further increase the stand-off height of the resulting node.

The different structures described herein such as the perforations, the nodes, and the integrated offset structures may be positioned at areas of an apparel item other than those described with respect to the apparel item 100 in accordance with aspects herein. In one aspect, the different placement patterns for these structures may be dependent upon, for instance, air pressure maps of the human body, skin temperature maps of the human body, sweat maps of the human body, and/or contact maps of the human body (maps indicating parts of the body that come into contact with a loose-fitting garment averaged over several athletic positions). With respect to one or more of these maps, such as contact maps, the contact map may be for a particular sport. For instance, when the apparel item is in the form of a sleeveless jersey used for, for instance, basketball, the placement of the nodes may be adjusted such that besides being positioned along the side portions of the apparel item, the nodes may also be positioned along the upper front and shoulder regions of the apparel item as contact maps may indicate a higher contact of the jersey with the basketball player's skin in these areas. Based on contact maps, other exemplary areas in which nodes may be located comprise, for example, the upper back portions of shirts, or jerseys, sleeve portions in areas configured to be positioned adjacent to the shoulder or deltoid area of the wearer. When the apparel item is in the form of a pant, the nodes may be positioned along an anterior aspect of the leg portions of the pant such that they are positioned adjacent to the quadriceps muscle group of the wearer when the pant is worn, and they may be positioned along a posterior aspect of the leg portions of the pant such that they are positioned adjacent to the calf muscles of the wearer. Any and all aspects, and any variation thereof, are contemplated as being within aspects herein. By providing stand-off in these areas, the perception of cling may be reduced thereby improving wearer comfort.

Figure 16:
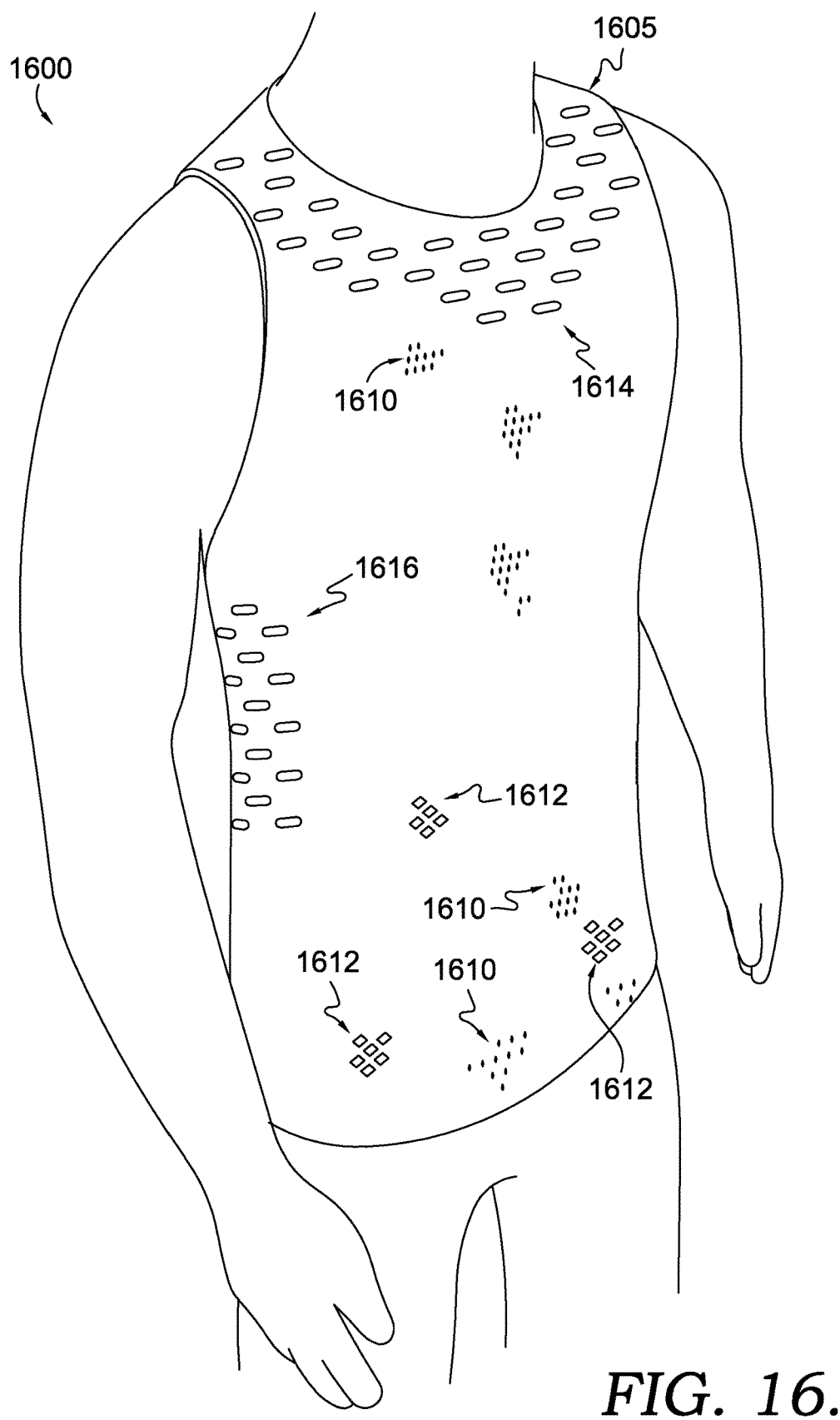
FIG. 16 illustrates a front perspective view of exemplary apparel item configured to reduce the perception of cling in an as-worn configuration in accordance with aspects hereof.

An exemplary apparel item depicting a different arrangement of the structures described herein is depicted in FIG. 16 in accordance with aspects herein. FIG. 16 depicts a front perspective view of an exemplary apparel item 1600 in an as-worn configuration. The apparel item 1600 is in the form of a sleeveless jersey, although it is contemplated herein that the apparel item 1600 may comprise sleeves. In an exemplary aspect, the apparel item 1600 may be configured for use by athletes participating in the sport of basketball. The apparel item 1600 comprises at least a torso portion 1605 adapted to be positioned adjacent to a front and back torso area of a wearer when the apparel item 1600 is worn.

Similar to the apparel item 100, the apparel item 1600 comprises a plurality of perforations 1610 that extend through the material forming the torso portion 1605. Much of the discussion regarding the perforations 112 of the apparel item 100 is applicable to the perforations 1610. The perforations are generally located along the front midline of the torso portion 1605. The perforations 1610 may also extend along left and right side portions of the torso portion 1605 and may extend along the back midline of the torso portion 1605. As well, the perforations 1610 may extend from a collar or neckline portion of the torso portion 1605 to a lower margin or edge of the torso portion 1605. Any and all aspects, and any variation thereof, are contemplated as being within aspects herein.

Further similar to the apparel item 100, the apparel item 1600 may comprise a plurality of integrated offset structures 1612 located on an inner-facing surface of the torso portion 1605. Much of the discussion of the integrated offset structures 120 with respect to the apparel item 100 is equally applicable to the integrated offset structures 1612. For example, the location of the integrated offset structures 1612 may be similar to the location of the integrated offset structures 120 (proximate to the bottom margin of the torso portion 1605 of the apparel item 1600 and along the right and left side portions of the torso portion 1605).

The apparel item 1600 may further comprise a first plurality of inwardly-facing nodes 1614 located proximate (i.e., within 2 cm to 30 cm) of the neckline of the torso portion 1605 and extending along the shoulder straps of the torso portion 1605. The apparel item 1600 may also comprise a second plurality of inwardly-facing nodes 1616 extending along the right and left side portions of the torso portion 1605. In other words, both the nodes 1614 and the nodes 1616 extend away from the fabric material forming the apparel item 1600 toward a body surface of a wearer when the apparel item 1600 is worn. In exemplary aspects, the nodes 1614 and 1616 may not comprise perforations, although it is contemplated herein that some or all of the nodes 1614 and 1616 may be perforated. The nodes 1614 and 1616 may be formed using the method 1300 and/or the method 1400. Any and all aspects, and any variation thereof, are contemplated as being within aspects herein.

The present invention has been described in relation to particular examples, which are intended in all respects to be illustrative rather than restrictive. Alternative embodiments will become apparent to those of ordinary skill in the art to which the present invention pertains without departing from its scope. Certain features and subcombinations are of utility and may be employed without reference to other features and subcombinations and are contemplated within the scope of the claims.

What is claimed is:

1. An apparel item for an upper torso of a wearer configured for reduced cling perception, the apparel item comprising:
at least a front portion and a back portion that together form the apparel item, the front portion and the back portion formed from a single-layer fabric material having a base contact level, the single-layer fabric material that forms the front portion and the back portion of the apparel item comprising an inner-facing surface and an outer-facing surface of the apparel item;
a first set of self-standing nodes located in a first area of the apparel item, the first set of self-standing nodes projecting from the base contact level outward from the outer-facing surface of the apparel item, at least a portion of the first set of self-standing nodes having a first plurality of apertures;
a second set of self-standing nodes located in a second area of the apparel item, the second set of self-standing nodes projecting from the base contact level outward from the outer-facing surface of the apparel item, at least a portion of the second set of self-standing nodes having a second plurality of apertures; and
a third set of self-standing nodes located in a third area of the apparel item, the third set of self-standing nodes projecting from the base contact level inward from the inner-facing surface of the apparel item, wherein the reduced cling perception is created by the first set of self-standing nodes and the second set of self-standing nodes channeling air to enter and exit, respectively, a space on the inner-facing surface of the third area created by the third set of self-standing nodes.

2. The apparel item of claim 1, wherein the first set of self-standing nodes is located along front side portions of the apparel item.

3. The apparel item of claim 2, wherein the second set of self-standing nodes is located along back side portions of the apparel item.

4. The apparel item of claim 3, wherein the third set of self-standing nodes is located between the first and second sets of self-standing nodes such that they are located airing left and right sides of the apparel item.

5. The apparel item of claim 1, wherein the first plurality of apertures of each of the first set of self-standing nodes and the second plurality of apertures of each of the second set of self-standing nodes have a gradation in diameter.

6. The apparel item of claim 5, wherein the gradation in diameter comprises an aperture having the largest diameter positioned centrally of its corresponding node and apertures extending away from the central aperture gradually decreasing in diameter.

7. The apparel item of claim 1, wherein the first plurality of apertures of each of the first set of self-standing nodes is positioned on a leading edge of each node, such that the first plurality of apertures are oriented toward a front midline of the apparel item.

8. The apparel item of claim 1, wherein the second plurality of apertures of each of the second set of self-standing nodes is positioned on a trailing edge of each node, such that the second plurality of apertures are oriented toward a back midline of the apparel item.

9. The apparel item of claim 1, further comprising a first plurality of perforations located on the front portion and the back portion of the apparel item.

10. The apparel item of claim 9, wherein a density of the first plurality of perforations is greater toward a front midline and a back midline of the apparel item.

11. The apparel item of claim 1, wherein the single-layer fabric material comprises a knit or woven material.

12. The apparel item of claim 11, further comprising a plurality of integrated offset structures located on the inner-facing surface of the apparel item, wherein the plurality of integrated offset structures project from a base contact level inward from the inner-facing surface of the apparel item.

13. The apparel item of claim 12, wherein the plurality of integrated offset structures are created by altering a weaving or knitting process used to form the single-layer fabric material.

14. The apparel item of claim 13, wherein the plurality of integrated offset structures are located along right and left side portions of the apparel item, and wherein the plurality of integrated offset structures are further located along a bottom portion of the apparel item on the front and back portions of the apparel item.

15. A method of manufacturing an apparel item configured to reduce the perception of cling, the method comprising:

provided a single-layer fabric material having a first surface and an opposite second surface, the fabric material having a base contact level;

forming a first set of self-standing nodes located in a first area of the fabric material, the first set of self-standing nodes projecting from the base contact level outward from the first surface of the fabric material;

forming a first plurality of apertures in at least a portion of the first set of self-standing nodes;

forming a second set of self-standing nodes located in a second area of the fabric material, the second set of self-standing nodes projecting from the base contact level outward from the first surface of the fabric material;

forming a second plurality of apertures in at least a portion of the second set of self-standing nodes;

forming a third set of self-standing nodes located in a third area of the fabric material, the third set of self-standing nodes projecting from the base contact level inward from the second surface of the fabric material; and forming the fabric material into the apparel item comprising at least a front portion and a back portion, wherein the first surface forms an outer-facing surface of the apparel item and the second surface forms an inner-facing surface of the apparel item, wherein the reduced perception of cling is created by the first self-standing and the second set of self-standing nodes channeling air to enter and exit, respectively, a space on the inner-facing surface of the third area created by the third set of self-standing nodes.

16. The method of manufacturing of claim 15, wherein upon forming the fabric material into the apparel item:

the first set of self-standing nodes is located on front side portions;

the second set of self-standing nodes k located on back side portions; and the third set of self-standing nodes is located between the first set of self-standing nodes and the second set of self-standing nodes such that they are located along left and right sides of the apparel item.

17. The method of manufacturing of claim 15, further comprising:

forming a first plurality of perforations, wherein upon forming the fabric material into the apparel item, the first plurality of perforations are located on the front and back portions of the apparel item.

18. The method of manufacturing of claim 15, wherein the single-layer fabric material is formed by a weaving or knitting process.

19. The method of manufacturing of claim 18, wherein the weaving or knitting process is altered to create a plurality of integrated offset structures located on the second surface of the fabric material, wherein the plurality of integrated offset structures project from the base contact level inward from the second surface of the apparel item.

20. The method of manufacturing of claim 19, wherein upon forming the fabric material into the apparel item, the plurality of integrated offset structures are located along right and left side portions of the apparel item, and wherein the plurality of integrated offset structures are further located along a bottom portion of the apparel item on the front and hack portions of the apparel item.

* * * * *

UNITED STATES PATENT AND TRADEMARK OFFICE
CERTIFICATE OF CORRECTION

PATENT NO. : 10,271,580 B2  
APPLICATION NO. : 15/263537  
DATED : April 30, 2019  
INVENTOR(S) : Christian Darby Page 1 of 1

It is certified that error appears in the above-identified patent and that said Letters Patent is hereby corrected as shown below:

On the Title Page

Column 2, "(Continued)": After "or Firm –" delete "Shool" and replace with "Shook".

In the Claims

Column 22, Line 34: After "located" delete "airing" and replace with "along".
Column 22, Line 66: After "from" delete "a base contact level" and replace with "the base contact level".
Column 24, Line 10: After "nodes" delete "k" and replace with "is".
Column 24, Line 37: After "nodes" delete "hack" and replace with "back".

Signed and Sealed this  
Second Day of July, 2019

Andrei Iancu  
*Director of the United States Patent and Trademark Office*